United States Patent
Nakahara

(10) Patent No.: US 9,497,584 B2
(45) Date of Patent: Nov. 15, 2016

(54) ACTION PATTERN ANALYSIS DEVICE, ACTION PATTERN ANALYSIS METHOD, AND ACTION PATTERN ANALYSIS PROGRAM

(75) Inventor: Fumitaka Nakahara, Minato-ku (JP)

(73) Assignee: NEC CORPORATION, Tokyo (JP)

( * ) Notice: Subject to any disclaimer, the term of this patent is extended or adjusted under 35 U.S.C. 154(b) by 538 days.

(21) Appl. No.: 13/977,386

(22) PCT Filed: Jan. 12, 2012

(86) PCT No.: PCT/JP2012/000140
§ 371 (c)(1),
(2), (4) Date: Jun. 28, 2013

(87) PCT Pub. No.: WO2012/096175
PCT Pub. Date: Jul. 19, 2012

(65) Prior Publication Data
US 2013/0273937 A1 Oct. 17, 2013

(30) Foreign Application Priority Data

| Jan. 14, 2011 | (JP) | 2011-006260 |
| May 16, 2011 | (JP) | 2011-109400 |
| Sep. 21, 2011 | (JP) | 2011-206345 |

(51) Int. Cl.
*H04W 24/00* (2009.01)
*H04W 4/02* (2009.01)
(Continued)

(52) U.S. Cl.
CPC ............... *H04W 4/02* (2013.01); *G01S 19/24* (2013.01); *G01S 19/35* (2013.01); *G06F 17/30241* (2013.01); *G01S 19/13* (2013.01); *G01S 19/42* (2013.01)

(58) Field of Classification Search
CPC ............................... H04W 64/00; H04W 4/02
See application file for complete search history.

(56) References Cited

U.S. PATENT DOCUMENTS

| 6,975,939 B2* | 12/2005 | Edwards ............... H04W 24/00 455/456.1 |
| 2005/0043037 A1* | 2/2005 | Ioppe ..................... H04W 4/02 455/456.1 |

(Continued)

FOREIGN PATENT DOCUMENTS

| JP | 2003-076818 A | 3/2003 |
| JP | 2009-116541 A | 5/2009 |

OTHER PUBLICATIONS

Kazuya Okada, et al., "Proposal of a Method for Extracting Points of Interest from User's Trajectory", IPSJ SIG Notes, Sep. 26, 2008, pp. 89-94, vol. 2008, No. 91.

(Continued)

*Primary Examiner* — Shantell L Heiber
(74) *Attorney, Agent, or Firm* — Sughrue Mion, PLLC

(57) ABSTRACT

A position information plot means 81 plots a position information log containing a user's measurement position and measurement date/time on a multidimensional space defined by numerical information indicating the measurement position and a time. A slay point cluster extraction means 82 weights the position information log so that a Euclidean distance in a time direction relative to a position information space is easily determined as short, and clusters the weighted position information logs thereby to extract a stay point where the user frequently stays. A moving path cluster extraction means 84 weights a position information log at a non-stay point so that a Euclidean distance in a time direction relative to a position information space is easily determined as long, and clusters the weighted position information logs thereby to extract a user's moving path.

6 Claims, 13 Drawing Sheets

(51) Int. Cl.
  *G06F 17/30* (2006.01)
  *G01S 19/24* (2010.01)
  *G01S 19/35* (2010.01)
  *G01S 19/13* (2010.01)
  *G01S 19/42* (2010.01)

(56) References Cited

U.S. PATENT DOCUMENTS

2009/0307262 A1* 12/2009 Jeong ............... G06F 17/3087
2010/0153292 A1* 6/2010 Zheng ............... G06Q 30/02
                                                        705/347
2011/0208425 A1* 8/2011 Zheng ............... G01S 19/14
                                                        701/532

OTHER PUBLICATIONS

Hideki Yoshii, et al., "A Study on analyzing GPS-based Location Data Using Segment Velocity Technique", IEICE Technical Report, May 14, 2009, pp. 109-112, vol. 109, No. 39.

Shinji Kami, et al., "Algorithm for Detecting Significant Locations from Raw GPS Data", 2010 Nen IEICE Communications Society Conference Koen Ronbunshu, Aug. 31, 2010, pp. 406, vol. 2, No. B-20-3.

Yang Yue et al: "Mining time-dependent attractive areas and movement patterns from taxi trajectory data", Geoinformatics, 2009 17th International Conference on, IEEE, Piscataway, NJ, USA, Aug. 12, 2009, pp. 1-6, XP031607549,DOI: 10.1109/BMEI.2009.5304881, ISBN: 978-1-4244-4562-2.

Zhixiang Fang et al: "An Integrated Space-Time Pattern Classification Approach for Individuals' Travel Trajectories", Fuzzy Systems and Knowledge Discovery,2009. FSKD "09. Sixth International Conference on, IEEE, Piscataway, NJ, USA,Aug. 14, 2009, pp. 119-123, XP031583861, ISBN: 978-0-7695-3735-1.

James Rosswog et al: "Detecting and Tracking Spatio-temporal Clusters with Adaptive History Filtering", Data Mining Workshops, 2008. ICDMW '08. IEEE International Conference on, IEEE, Piscataway, NJ, USA,Dec. 15, 2008, pp. 448-457, XP031383786, ISBN: 978-0-7695-3503-6.

Nobuharu Kami et al: "Algorithm for Detecting Significant Locations from Raw GPS Data", Oct. 6, 2010, Discovery Science, Springer Berlin Heidelberg, Berlin, Heidelberg, pp. 221-235, XP019155481,ISBN: 978-3-642-16183-4.

Yu Zheng et al: "Mining interesting locations and travel sequences from GPS trajectories", International World Wide Web Conference 18th; Apr. 20, 2009-Apr. 24, 2009, pp. 791-800, XP058O2565O, DOI: 10.1145/1526709.1526816, ISBN: 978-1-60558-487-4.

Communication dated Jan. 8, 2015, issued by the European Patent Office in counterpart Application No. 12734268.1.

* cited by examiner

| USER IDENTIFIER | DATE/TIME | LATITUDE | LONGITUDE |
|---|---|---|---|
| User_A | 2010-09-02  13:45:00 | 35.2 | 139.5 |
| User_A | 2010-09-02  14:03:10 | 35.21 | 139.51 |
| User_A | 2010-09-09  13:56:02 | 35.19 | 139.49 |

FIG. 5

| USER IDENTIFIER | STAY POINT IDENTIFIER | STAY START TIME | STAY END TIME | LATITUDE | LONGITUDE |
|---|---|---|---|---|---|
| User_A | Thu_Stop01 | 13:45:00 | 14:03:10 | 35.2 | 139.5 |
| User_A | Thu_Stop02 | 16:00:00 | 18:08:00 | 35.5 | 139.6 |
| User_A | Thu_Stop03 | 20:00:00 | 22:03:12 | 35.6 | 139.5 |

FIG. 6

| USER IDENTIFIER | MOVING PATH IDENTIFIER | MOVING START TIME | MOVING END TIME | FIRST CLOSE STAY POINT IDENTIFIER | SECOND CLOSE STAY POINT IDENTIFIER |
|---|---|---|---|---|---|
| User_A | Thu_Route01 | 14:15:00 | 15:53:10 | Thu_Stop01 | Thu_Stop02 |
| User_A | Thu_Route02 | 16:00:00 | 18:08:00 | Thu_Stop02 | Thu_Stop03 |
| User_A | Thu_Route03 | 20:00:00 | 22:03:12 | Thu_Stop03 | Thu_Stop04 |

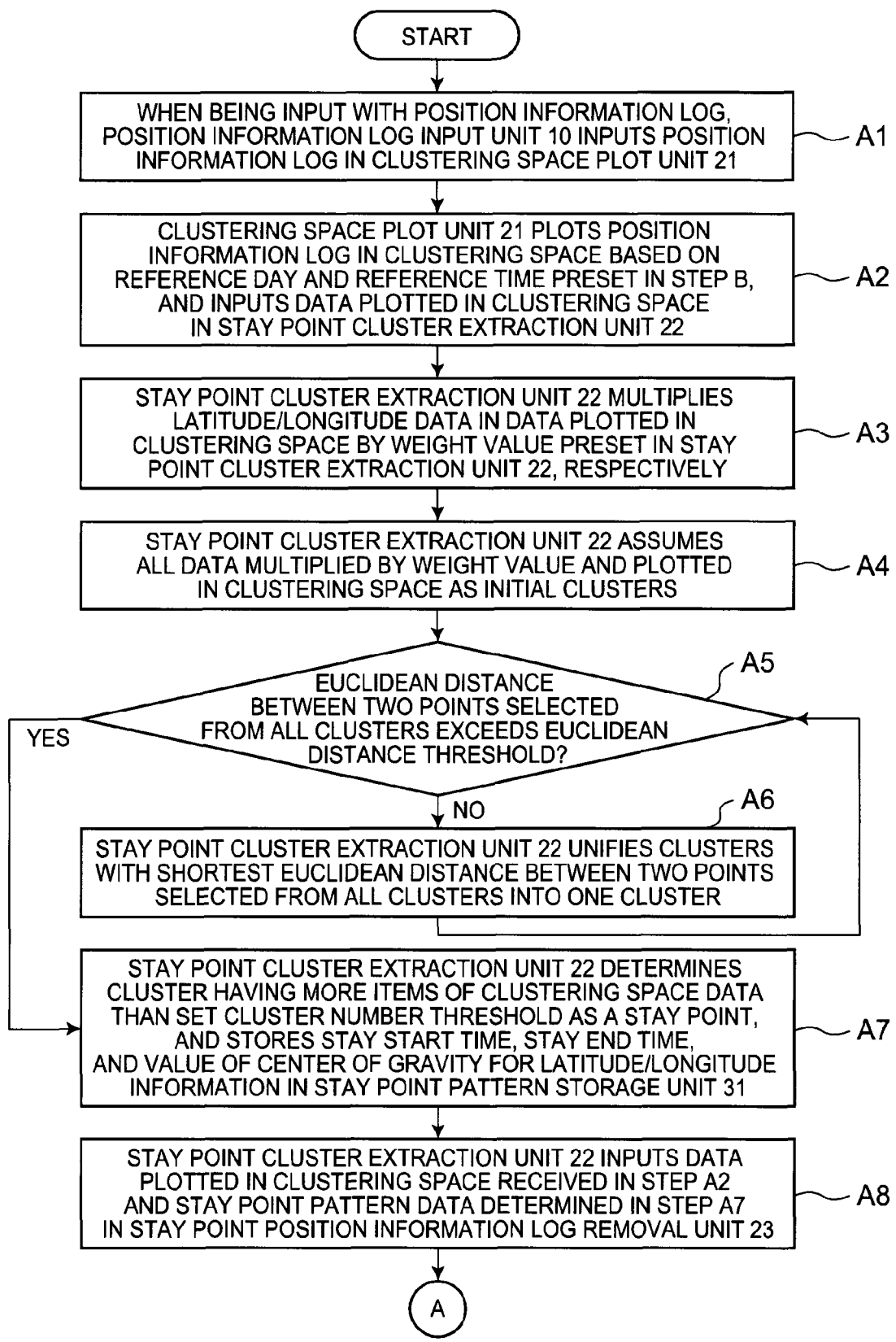

ACTION PATTERN ANALYSIS DEVICE, ACTION PATTERN ANALYSIS METHOD, AND ACTION PATTERN ANALYSIS PROGRAM

CROSS REFERENCE TO RELATED APPLICATIONS

This application is a National Stage of International Application No. PCT/JP2012/000140 filed Jan. 12, 2012, claiming priority based on Japanese Patent Application Nos. 2011-006260, filed Jan. 14, 2011, 2011-109400, filed May 16, 2011 and 2011-206345, filed Sep. 21, 2011, the contents of all of which are incorporated herein by reference in their entirety.

TECHNICAL FIELD

The present invention relates to an action pattern analysis device, an action pattern analysis method and an action pattern analysis program for analyzing an action pattern based on irregularly-measured position information.

BACKGROUND ART

In recent years, LBSs (Location Based Service) such as lifelog or communication tools using position information are widely used. For LBS, an application for giving a position information log to a photograph shot by a camera-equipped mobile terminal by use of the GPS (Global Positioning System) function mounted on a cell phone, or Twitter (Trademark) capable of "tweet" with a position information log are widely used, for example. Additionally, as an exemplary LBS, a recommend service for distributing contents according to a user's action pattern acquirable from personal position information is present.

Patent Literature 1 describes therein an action management device capable of managing personal actions based on position information. The action management device described in Patent Literature 1 searches information or estimates actions for action management based on position information measured at predetermined time intervals by the GPS function.

CITATION LIST

Patent Literature

PLT1: Japanese Patent Application Laid-Open (JP-A) No. 2003-76818

SUMMARY OF INVENTION

Technical Problem

For provision of LBS, it is desirable to periodically measure position information at short time intervals in order to enhance an accuracy of services. However, since the position information is privacy information, a user may not want to provide periodically-measured position information to a service provider. Thus, there are many users who do not want to periodically measure position information for use of a service.

Based on the situation, position information may be measured by use of a terminal with a position information acquisition function at longer time intervals or position information may be irregularly measured. As described above, when position information is irregularly measured, the action management device described in Patent Literature 1 has a problem that it cannot manage actions with a good accuracy.

Thus, even when position information is measured at longer time intervals or position information is irregularly measured, it is desirable that user's daily action patterns such as where or when the user frequently stays, or a moving path or moving time in which the user frequently moves.

Thus, it is an exemplary object of the present invention to provide an action pattern analysis device, an action pattern analysis method and an action pattern analysis program capable of analyzing a user's action pattern with a good accuracy even when position information is measured at longer time intervals or position information is irregularly measured.

Solution to Problem

An action pattern analysis device according to an exemplary aspect of the present invention is characterized by comprising a position information plot means for plotting a position information log containing a user's measurement position and measurement date/time on a multidimensional space defined by numerical information indicating the measurement position and a time, a stay point cluster extraction means for weighting the position information log so that a Euclidean distance in a time direction relative to a position information space defined by the numerical information indicating the measurement position in the multidimensional space is easily determined as short, and for clustering the weighted position information logs thereby to extract a stay position where the user frequently stays, a non-stay point position information log extraction means for extracting, as non-stay points, a set of position information logs in which a position information log extracted as the stay point is removed from the position information logs plotted by the position information plot means, and a moving path cluster extraction means for weighting position information logs at the non-stay points so that a Euclidean distance in a time direction relative to the position information space is easily determined as long, and for clustering the weighted position information logs thereby to extract a user's moving path.

Another action pattern analysis device according to an exemplary aspect of the present invention is characterized by comprising a moving vector function value calculation means for calculating a time difference in measurement date/time contained in position information logs and a distance between measurement positions as differential values between the two adjacent position information logs sorted in an order of measurement date/time contained in the position information logs containing a user's measurement position and measurement date/time, an attribute determination means for determining, based on the time difference in measurement date/time and the distance between the measurement positions, whether an attribute of the position information log is a stay attribute indicating a stay point where the user frequently stays or a non-stay attribute indicating a non-stay point on a user's moving path, a position information plot means for plotting the position information log on a multidimensional space defined by the numerical information indicating the measurement position and a time, a stay point cluster extraction means for weighting the position information log so that a Euclidean distance in a time direction relative to a position information space defined by the numerical information indicating the measurement position in the multidimensional space is easily determined as short, and for clustering position information logs determined as having the stay attribute among the weighted position information logs thereby to extract the stay point, and a moving path cluster extraction means for weighting the position information log so that a Euclidean distance in a time direction relative to the position information space is easily determined as long, and for clustering position information logs determined as having the non-stay attribute among the weighted position information logs thereby to extract a user's moving path.

An action pattern analysis method according to an exemplary aspect of the present invention is characterized by plotting a position information log containing a user's measurement position and measurement date/time on a multidimensional space defined by numerical information indicating the measurement position and a time, weighting the position information log so that a Euclidean distance in a time direction relative to a position information space defined by the numerical information indicating the measurement position in the multidimensional space is easily determined as short, and clustering the weighted position information logs thereby to extract a stay position where the user frequently stays, extracting, as non-stay points, a set of position information logs in which a position information log extracted as the stay point is removed from the position information logs plotted on the multidimensional space, and weighting position information logs at the non-stay points so that a Euclidean distance in a time direction relative to the position information space is easily determined as long, and clustering the weighted position information logs thereby to extract a user's moving path.

Another action pattern analysis method according to an exemplary aspect of the present invention is characterized by calculating a time difference in measurement date/time contained in position information logs and a distance between measurement positions as differential values between the two adjacent position information logs sorted in an order of measurement date/time contained in the position information logs containing a user's measurement position and measurement date/time, determining, based on the time difference in measurement date/time and the distance between the measurement positions, whether an attribute of the position information log is a stay attribute indicating a stay point where the user frequently stays or a non-stay attribute indicating a non-stay point on a user's moving path, plotting the position information log on a multidimensional space defined by the numerical information indicating the measurement position and a time, weighting the position information log so that a Euclidean distance in a time direction relative to a position information space defined by the numerical information indicating the measurement position in the multidimensional space is easily determined as short, and clustering position information logs determined as having the stay attribute among the weighted position information logs thereby to extract the stay point, and weighting the position information log so that a Euclidean distance in a time direction relative to the position information space is easily determined as long, and clustering position information logs determined as having the non-stay attribute among the weighted position information logs thereby to extract a user's moving path.

An action pattern analysis program according to an exemplary aspect of the present invention is characterized by causing a computer to perform a position information plot processing of plotting a position information log containing a user's measurement position and measurement date/time on a multidimensional space defined by numerical information indicating the measurement position and a time, a stay point cluster extraction processing of weighting the position information log so that a Euclidean distance in a time direction relative to a position information space defined by the numerical information indicating the measurement position in the multidimensional space is easily determined as short, and clustering the weighted position information logs thereby to extract a stay point where the user frequently stays, a non-stay point position information log extraction processing of extracting, as non-stay points, a set of position information logs in which a position information log extracted as the stay point is removed from the position information logs plotted by the position information plot processing, and a moving path cluster extraction processing of weighting position information logs at the non-stay points so that a Euclidean distance in a time direction relative to the position information space is easily determined as long, and clustering the weighted position information logs thereby to extract a user's moving path.

Another action pattern analysis program according to an exemplary aspect of the present invention is characterized by causing a computer to perform a moving vector function value calculation processing of calculating a time difference in measurement date/time contained in position information logs and a distance between measurement positions as differential values between the two adjacent position information logs sorted in an order of measurement date/time contained in the position information logs containing a user's measurement position and measurement date/time, an attribute determination processing of determining, based on the time difference in measurement date/time and the distance between the measurement positions, whether an attribute of the position information log is a stay attribute indicating a stay point where the user frequently stays or a non-stay attribute indicating a non-stay point on a user's moving path, a position information plot processing of plotting the position information log on a multidimensional space defined by the numerical information indicating the measurement position and a time, a stay point cluster extraction processing of weighting the position information log so that a Euclidean distance in a time direction relative to a position information space defined by the numerical information indicating the measurement position in the multidimensional space is easily determined as short, and clustering a position information log determined as having the stay attribute among the weighted position information logs thereby to extract the stay point, and a moving path cluster extraction processing of weighting the position information log so that a Euclidean distance in a time direction relative to the position information space is easily determined as long, and clustering position information logs determined as having the non-stay attribute among the weighted position information logs thereby to extract a user's moving path.

Advantageous Effects of Invention

According to the present invention, it is possible to analyze user's action patterns with a good accuracy even when position information is measured at longer time intervals or position information is irregularly measured.

BRIEF DESCRIPTION OF DRAWINGS

FIG. 5 It depicts an explanatory diagram illustrating exemplary stay point pattern data.

FIG. 6 It depicts an explanatory diagram illustrating exemplary moving path pattern data.

FIG. 7 It depicts a flowchart illustrating exemplary operations of the action pattern analysis device.

DESCRIPTION OF EMBODIMENTS

Exemplary Embodiments according to the present invention will be described below with reference to the drawings. In the following description, there will be assumed a lifelog service for recording position information and a time when the position information is acquired by use of sensor information by GPS mounted on a portable terminal.

First Exemplary Embodiment

Figures 1, 2:
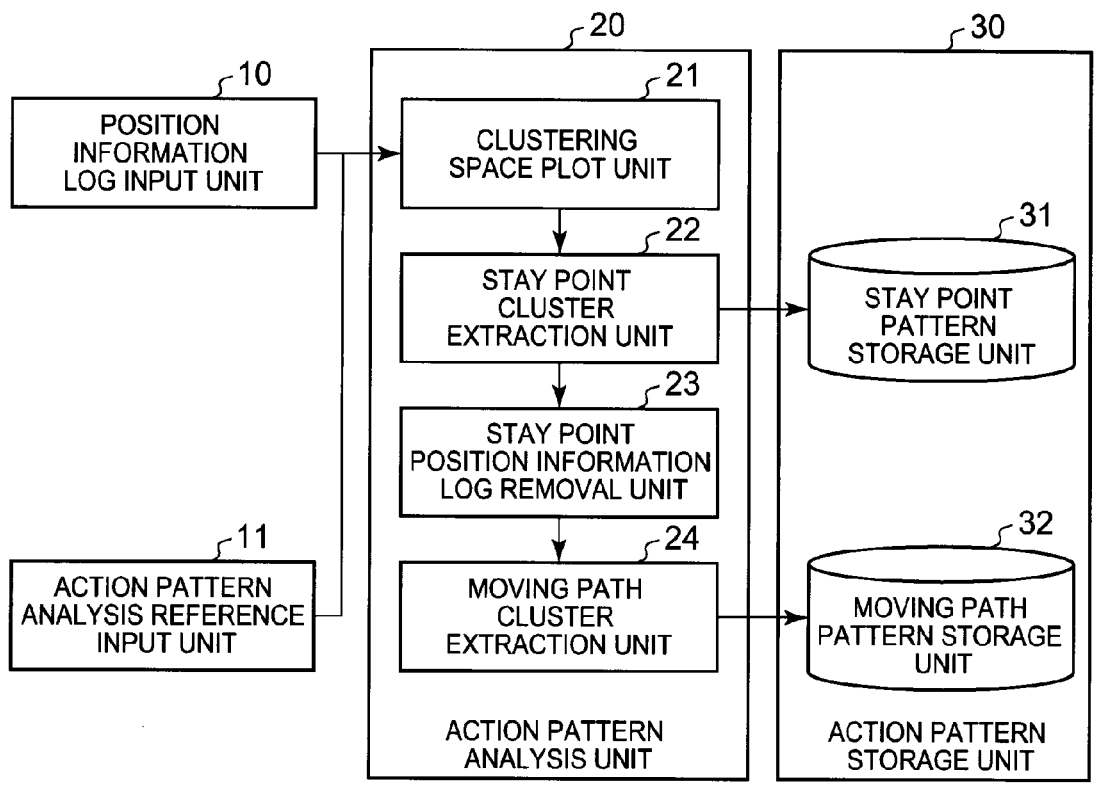
FIG. 1 It depicts a block diagram illustrating an exemplary structure of an action pattern analysis device according to a first exemplary embodiment of the present invention.
FIG. 2 It depicts an explanatory diagram illustrating exemplary position information logs.

FIG. 1 is a block diagram illustrating an exemplary structure of an action pattern analysis device according to a first exemplary embodiment of the present invention. The action pattern analysis device according to the present exemplary embodiment comprises a position information log input unit 10, an action pattern analysis reference input unit 11, an action pattern analysis unit 20 and an action pattern storage unit 30.

When being input with a user's position information log acquired by a cell phone or the like mounting a GPS function thereon, the position information log input unit 10 inputs the position information log in the action pattern analysis unit 20. The position information log contains numerical information indicating a position of the terminal which acquires the positions such latitude, longitude and altitude, and date/time information indicating when the numerical information (position information) is acquired. In other words, the position information log contains a measurement position and a measurement date/time of a terminal user. The position information log may contain an identifier of the terminal which acquires the position information, and an identifier of the terminal user (which will be denoted as user identifier below). FIG. 2 is an explanatory diagram illustrating exemplary position information logs. The example illustrated in FIG. 2 indicates that the position information log contains a user identifier, date/time, latitude and longitude.

The action pattern analysis reference input unit 11 inputs, into the action pattern analysis unit 20, reference information (which may be simply denoted as reference below) for analyzing an action pattern based on the position information log by the action pattern analysis unit 20 described later. Specifically, the action pattern analysis reference input unit 11 inputs, into the action pattern analysis unit 20, a reference of day (which will be denoted as day reference below) to be analyzed such as "Thursday" or "all days", or a reference of time (which will be denoted as time reference below) to be analyzed such as "3 a.m.". That is, the references are information for designating date/time information of a position information log to be analyzed.

The action pattern analysis unit 20 extracts a position where a terminal user frequently stays (which will be denoted as stay point below) and a path in which the terminal user frequently moves (which will be denoted as moving path below) by analyzing a position information log. The items of extracted information will be collectively denoted as action pattern data below.

The action pattern analysis unit 20 includes a clustering space plot unit 21, a stay point cluster extraction unit 22, a stay point position information log removal unit 23, and a moving path cluster extraction unit 24.

The clustering space plot unit 21 plots a position information log to be analyzed in a clustering space. The clustering space indicates a super-space added with the numerical values indicating a position such as latitude, longitude and altitude, and a time axis indicating a time. In other words, the clustering space is a multidimensional space defined by position information and date/time information, or at least a 3D space defined by latitude, longitude and time. Plotting a position information log in a clustering space means indicating a position information log in a clustering space by a coordinate. Further, a position information log plotted in a clustering space may be denoted as data plotted in a clustering space, or clustering space data.

Figure 3:
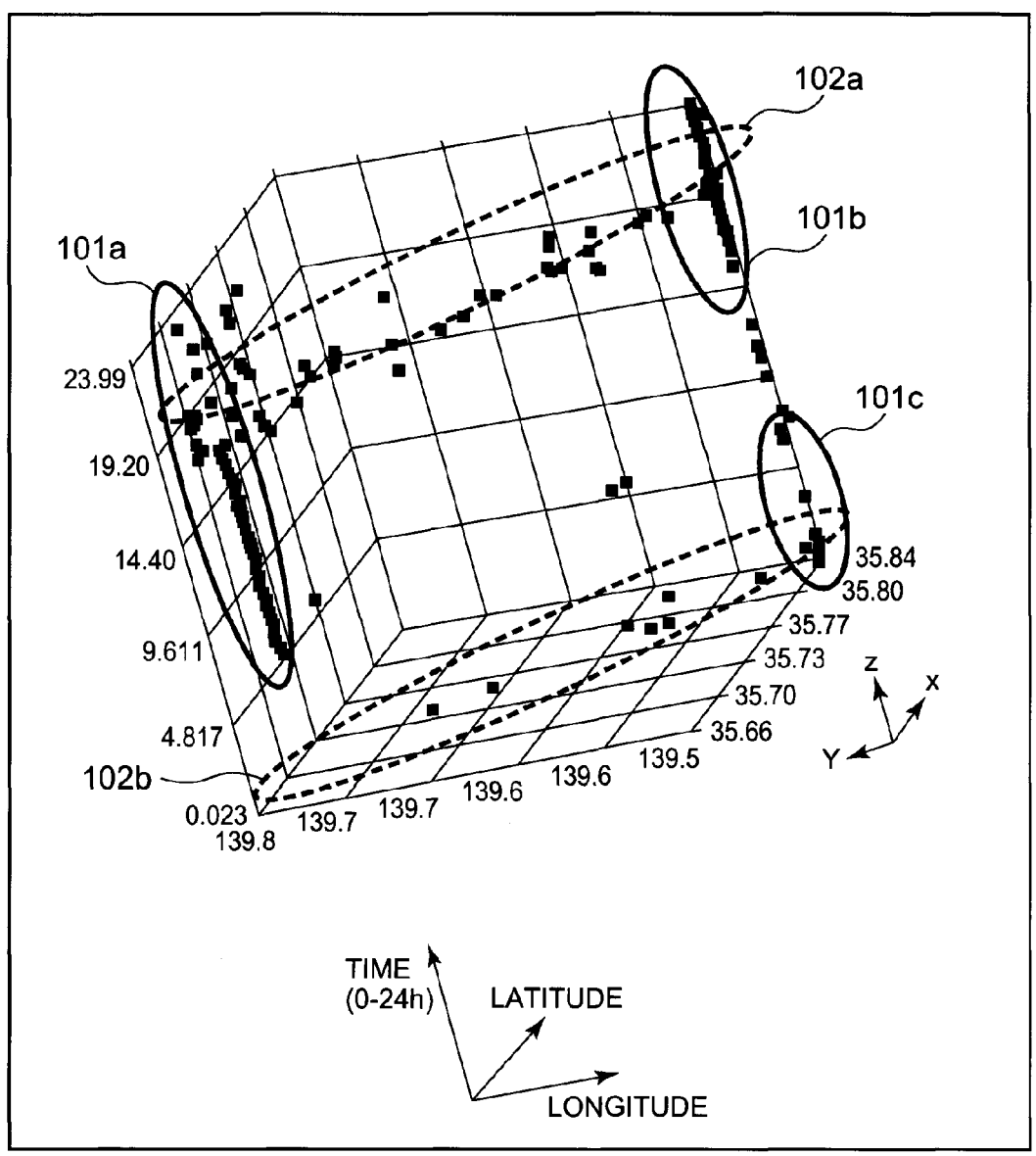
FIG. 3 It depicts an exemplary diagram illustrating an exemplary clustering space.

FIG. 3 is an explanatory diagram illustrating an exemplary clustering space. The clustering space illustrated in FIG. 3 is a 3D space defined by a latitude axis, a longitude axis and a time axis, which correspond to the x axis, the y axis and the z axis, respectively. FIG. 3 will be described later in detail.

The clustering space plot unit 21 holds the values of a day reference and a time reference input from the action pattern analysis reference input unit 11. The clustering space plot unit 21 plots a position information log in a clustering space based on the held values of the day reference and the time reference, and a user's position information log input from the position information log input unit 10. The clustering space plot unit 21 is to analyze a position information log acquired within a predetermined period of time from a reference when analyzing an action pattern, for example. Thereafter, the clustering space plot unit 21 inputs the data plotted in the clustering space in the stay point cluster extraction unit 22.

Figure 4:
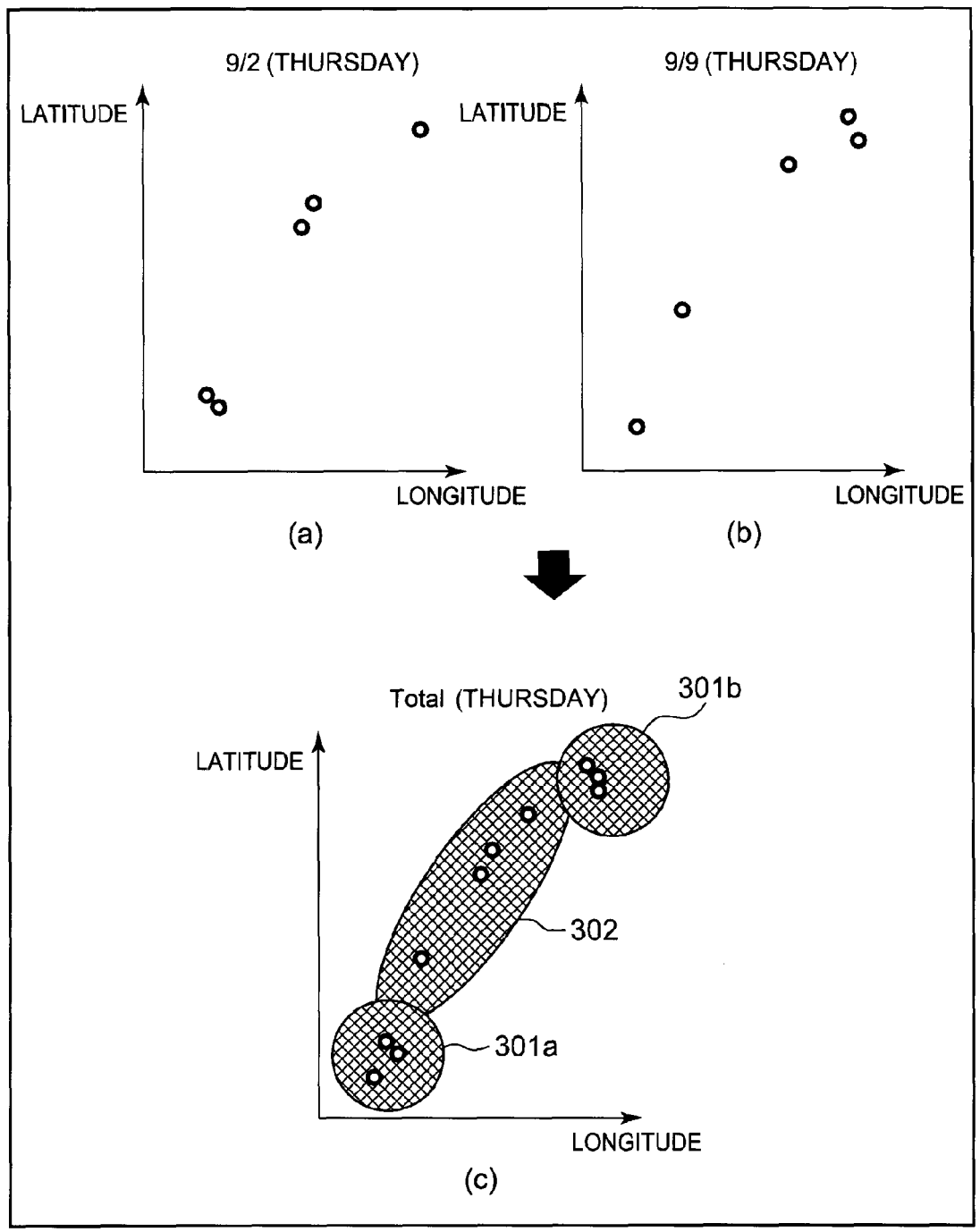
FIG. 4 It depicts an explanatory diagram illustrating exemplary position information logs plotted in a clustering space.

FIG. 4 is an explanatory diagram illustrating exemplary position information logs plotted in the clustering space. For simplified description, FIG. 4 illustrates an example in which the position information logs are plotted in the clustering space where the latitude-longitude plans are indicated by date, and the position information logs are accumulated.

It is assumed that position information logs from September 1 (wed) to September 14 (Tue) are present, the day reference is "Thursday" and the time reference is "3 a. m.", for example. In this case, the clustering space plot unit 21 extracts the position information logs from September 2 (Thu), 3 a.m. to September 3, 3 a.m., and the position information logs from September 9 (Thu), 3 a.m. to September 10, 3 a.m. The clustering space plot unit 21 removes the dates of the extracted position information logs, and plots the position information logs in the clustering space where the latitude-longitude plan is added with the time axis on a time sequence from 3 a.m. to next day's 3 a.m. (see FIGS. 4(a) and 4(b)). The clustering space plot unit 21 generates a clustering space where the position information logs for the two days are accumulated (see FIG. 4(c)).

In the above description, there has been described the case in which the clustering space plot unit 21 plots the position information logs by date in the 2D plan defined by latitude and longitude, and then accumulates the position information logs. Additionally, the clustering space plot unit 21 may directly plot the position information logs in a 3D clustering space defined by latitude, longitude and time. When the position information on the position information log contains latitude, longitude and altitude, the clustering space plot unit 21 may plot the position information log in a 4D clustering space defined by latitude, longitude, altitude and time.

The stay point cluster extraction unit 22 clusters clustering space data and extracts a position (or a stay point) where the terminal user frequently stays. Specifically, the stay point cluster extraction unit 22 extracts a stay point by generating a set of position information logs with a short Euclidean distance on a space defined by the three variables of latitude, longitude and time by use of a general-purpose clustering method such as EM (Expectation Maximization) algorithm or hierarchy clustering. An extracted stay point may be denoted as stay point pattern data below.

A space where the stay point cluster extraction unit 22 performs clustering is not limited to the space defined by the three variables of latitude, longitude and time. A space where clustering is performed may be a space defined by four or more variables. For example, when a position information log contains altitude, the stay point cluster extraction unit 22 may cluster the position information logs on the space defined by the four variables of latitude, longitude, altitude and time. In the following description, there will be specifically described a case in which a position information log is plotted on a space defined by the three variables of latitude, longitude and time.

Assuming that latitude is $X_i$, longitude is $Y_i$ and time is $Z_i$ in the coordinate indicated by the position information log, a square value of a Euclidean distance between two points is defined by $(X_1-X_2)^2+(Y_1-Y_2)^2+(Z_1-Z_2)^2$. The time Z is on a different unit system from the latitude X and the longitude Y. Thus, a distance function strongly related on a place (latitude-longitude plan) needs to be defined for the time on the space. A distance function obtained by multiplying the value of $(Z_1-Z_2)^2$ by a preset weight value $k_1$ is defined. That is, the function is defined as $(X_1-X_2)^2+(Y_1-Y_2)^2+k_1(Z_1-Z_2)^2$.

The weight value $k_1$ is to cause a difference between a distance between points present on the latitude-longitude plan and a distance between a point present on the latitude-longitude plan and a point present in the time axis direction. When the value of $k_1$ is smaller, a difference in time is smaller than a difference in distance when the position information logs are compared. Thus, since the value of $k_1$ is smaller so that a Euclidean distance on the time axis is easily determined as short to the latitude-longitude plan, a cluster can be generated, in which the logs in a close place (or a position defined by latitude and longitude) is often in the same set for the position information logs.

The weight value $k_1$ is designated at a result previously tuned to a magnitude of a stay point intended by the service user. For example, when the time Z is hour-based, if a stay point with a radius of about 1 km in Japan is to be extracted, the weight value $k_1$ is desirably set at about 1/1200.

In this way, when receiving the data plotted on the clustering space from the clustering space plot unit 21, the stay point cluster extraction unit 22 multiplies the latitude and the longitude of the data plotted in the clustering space by a preset weight value, respectively. The weight value may take any value by which a Euclidean distance on the time axis is easily determined as short to the latitude-longitude plan.

When the position information log contains altitude, assuming that the latitude in the coordinate indicated by the position information log is $X_i$, the longitude is $Y_i$, the time is $Z_i$, and the altitude is $W_i$, the distance function may be defined as $(X_1-X_2)^2+(Y_1-Y_2)^2+(W_1-W_2)^2+k_1(Z_1-Z_2)^2$.

Then, the stay point cluster extraction unit 22 calculates clustering for the clustering space data in order to extract a stay point by use of the clustering space data multiplied by the weight value. The clustering may be calculated by a well-known clustering method. There will be described herein a case in which clustering is calculated by a centroid method.

At first, the stay point cluster extraction unit 22 assumes all the items of data plotted on the clustering space as initial clusters, respectively, and unifies the clusters having the shortest Euclidean distance between two points selected from all the clusters into one cluster. At this time, the stay point cluster extraction unit 22 finds a value of the center of gravity from the values contained in the original clusters, and assumes the found value as a new data value of the unified cluster. The stay point cluster extraction unit 22 holds the number of items of clustering space data forming the unified cluster.

The stay point cluster extraction unit 22 repeatedly makes the above calculations as far as the Euclidean distance does not exceed a preset threshold (which will be denoted as first Euclidean distance threshold below). The first Euclidean distance threshold is desirably set to be as much as the weight value (about 1/1200, herein).

The stay point cluster extraction unit 22 determines, as a stay point, a cluster where the number of items of clustering space data found by the above calculations exceeds a preset threshold (which will be denoted as first cluster number threshold). The first cluster number threshold is set at a more appropriate value via test or the like. In other words, a position where more items of position information than the first cluster number threshold are measured may be denoted as a position where the user frequently stays.

For example, for the clustering space data illustrated in FIG. 4(c), the stay point cluster extraction unit 22 determines clusters 301a and 301b as stay points. Then, the stay point cluster extraction unit 22 stores, in a stay point pattern storage unit 31, the earliest time and the latest time in the data of the cluster, a value of the center of gravity in the position information (latitude and longitude) in the data of the cluster together with an identifier for identifying a stay point (which will be denoted as a stay point identifier below).

The stay point position information log removal unit 23 extracts a position information log which is not determined as a stay point by the stay point cluster extraction unit 22 from among the data passed from the clustering space plot unit 21. A set of position information logs will be denoted as non-stay point below.

The moving path cluster extraction unit 24 clusters clustering space data, and extracts a time zone and a moving path in which the terminal user frequently moves. An extracted moving path will be denoted as moving path pattern data below.

Specifically, the moving path cluster extraction unit 24 extracts a moving path by generating a set of position information logs with a short Euclidean distance on the space defined by the three variables of latitude, longitude and time by a general-purpose clustering method. Similarly as in the description for the stay point cluster extraction unit 22, a space in which the moving path cluster extraction unit 24 performs clustering is not limited to the space defined by the three variables of latitude, longitude and time, and may be a space defined by four or more variables.

Similarly as in the description for the stay point cluster extraction unit 22, a distance function for the three variables of latitude, longitude and time is defined as $(X_1-X_2)^2+(Y_1-Y_2)^2+k_2(Z_1-Z_2)^2$, and a distance function for the four variables of latitude, longitude, altitude and time is defined as $(X_1-X_2)^2+(Y_1-Y_2)^2+(W_1-W_2)^2+k_2(Z_1-Z_2)^2$. Since the value of $k_2$ is larger so that a Euclidean distance on the time axis to the latitude-longitude plan is easily determined as long, there can be generated a cluster in which the logs with a close time, not a close place (or a position defined by latitude and longitude) are often in the same set for the position information logs.

The weight value $k_2$ is designated at a result previously tuned to a magnitude of a stay point intended by the service user. A relationship of $k_1<k_2$ is established between the weight value $k_1$ when clustering a stay point and the weight value $k_2$ when calculating a moving path. The weight value $k_2$ is designated at a result previously tuned to a magnitude of a stay point intended by the service user. For example, when the time Z is hour-based, the weight value may be set at $k_2=1$.

Specifically, the moving path cluster extraction unit 24 first receives clustering space data which is not determined as a stay point from among the data plotted in the clustering space by the stay point position information log removal unit 23. Then, the moving path cluster extraction unit 24 multiplies the latitude and the longitude of the data plotted in the clustering space by the preset weight value, respectively. The weight value may take any value by which a Euclidean distance on the time axis is easily determined as long to the latitude-longitude plan.

The moving path cluster extraction unit 24 calculates clustering for the clustering space data in order to extract a place indicating a moving path by use of the clustering space data multiplied by the weight value. The clustering may be calculated by a well-known clustering method. There will be described herein a case in which clustering is calculated by a centroid method.

At first, the moving path cluster extraction unit 24 assumes the clustering space data received from the stay point position information log removal unit 23 as initial clusters, and unifies the clusters with the shortest Euclidean distance between two points selected from all the clusters into one cluster. At this time, the moving path cluster extraction unit 24 finds a value of the center of gravity from the values contained in the original clusters, and assumes the found value as a new data value of the unified cluster. The moving path cluster extraction unit 24 holds the number of items of clustering space data forming the unified cluster.

The moving path cluster extraction unit 24 repeatedly makes the above calculations as far as the Euclidean distance does not exceed a preset threshold (which will be denoted as second Euclidean distance threshold below). The second Euclidean distance threshold may be set to be as much as the weight value.

The moving path cluster extraction unit 24 determines, as a moving path, a cluster in which the number of items of clustering space data found by the above calculations exceeds a preset threshold (which will be denoted as second cluster number threshold below). The second cluster number threshold is set at a more appropriate value via test or the like. For example, for the clustering space data illustrated in FIG. 4(c), the moving path cluster extraction unit 24 determines a cluster 302 as a moving path.

The moving path cluster extraction unit 24 extracts the earliest time and the latest time from among the data in the cluster. Further, the moving path cluster extraction unit 24 determines, as a start point and an endpoint of the moving path, a stay point with the shortest Euclidean distance and a stay point with the second shortest Euclidean distance between two points of the clustering space data contained in the cluster (or the value of the center of gravity of the cluster) and the position information on all the stay points stored in the stay point pattern storage unit 31 (the value of the center of gravity for latitudes and longitudes at the stay points). Then, the moving path cluster extraction unit 24 stores the extracted time, start point and end point, and the determined stay point together with an identifier for identifying a moving path (which will be denoted as moving path identifier below) in the moving path pattern storage unit 32. The items of information for identifying a stay point with the shortest Euclidean distance and a stay point with the second shortest Euclidean distance are denoted as first close stay point identifier and second close stay point identifier, respectively.

In the clustering space illustrated in FIG. 3, the clusters in which clusters 101a, 101b and 101c are determined as stay points are illustrated, and the clusters in which clusters 102a and 102b are determined as moving paths are illustrated.

The action pattern analysis unit 20 (more specifically, the clustering space plot unit 21, the stay point cluster extraction unit 22, the stay point position information log removal unit 23 and the moving path cluster extraction unit 24) is realized by the CPU in a computer operating according to a program (action pattern analysis program). For example, the program is stored in a storage unit (not shown) in the action pattern analysis device, and the CPU reads the program, and may operate as the action pattern analysis unit 20 (more specifically, the clustering space plot unit 21, the stay point cluster extraction unit 22, the stay point position information log removal unit 23 and the moving path cluster extraction unit 24) according to the program. The clustering space plot unit 21, the stay point cluster extraction unit 22, the stay point position information log removal unit 23, and the moving path cluster extraction unit 24 may be realized by dedicated hardware, respectively.

The action pattern storage unit 30 stores the action pattern data analyzed by the action pattern analysis unit 20 as a database. The action pattern storage unit 30 includes a stay point pattern storage unit 31 and a moving path pattern storage unit 32.

The stay point pattern storage unit 31 stores the stay point pattern data extracted by the stay point cluster extraction unit 22 as a database. FIG. 5 is an explanatory diagram illustrating exemplary stay point pattern data. As illustrated in FIG. 5, the stay point pattern storage unit 31 stores, as stay point pattern data, user identifier, stay point identifier, stay start time, stay end time, latitude and longitude. When a position information log contains altitude, the stay point pattern storage unit 31 stores the stay point pattern data added with the altitude.

The moving path pattern storage unit 32 stores the moving path pattern data extracted by the moving path cluster extraction unit 24 as a database. FIG. 6 is an explanatory diagram illustrating exemplary moving path pattern data. As illustrated in FIG. 6, the moving path pattern storage unit 32 stores, as the moving path pattern data, user identifier, moving path identifier, moving start time, moving end time, first close stay point identifier and second close stay point identifier.

The action pattern storage unit 30 (more specifically, the stay point pattern storage unit 31 and the moving path pattern storage unit 32) is realized by a magnetic disk or the like, for example.

Figure 8:
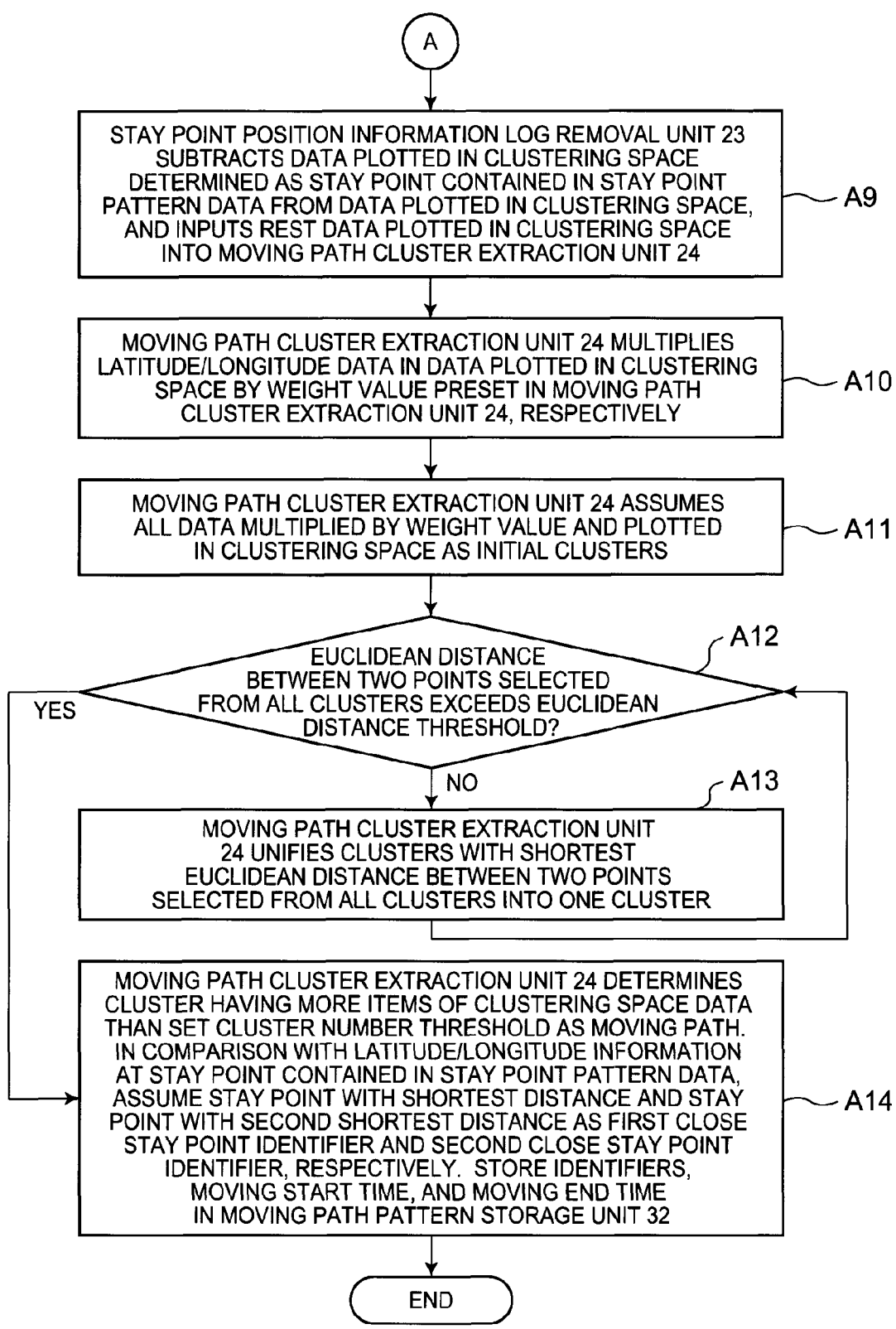
FIG. 8 It depicts a flowchart illustrating exemplary operations of the action pattern analysis device.
Figure 9:
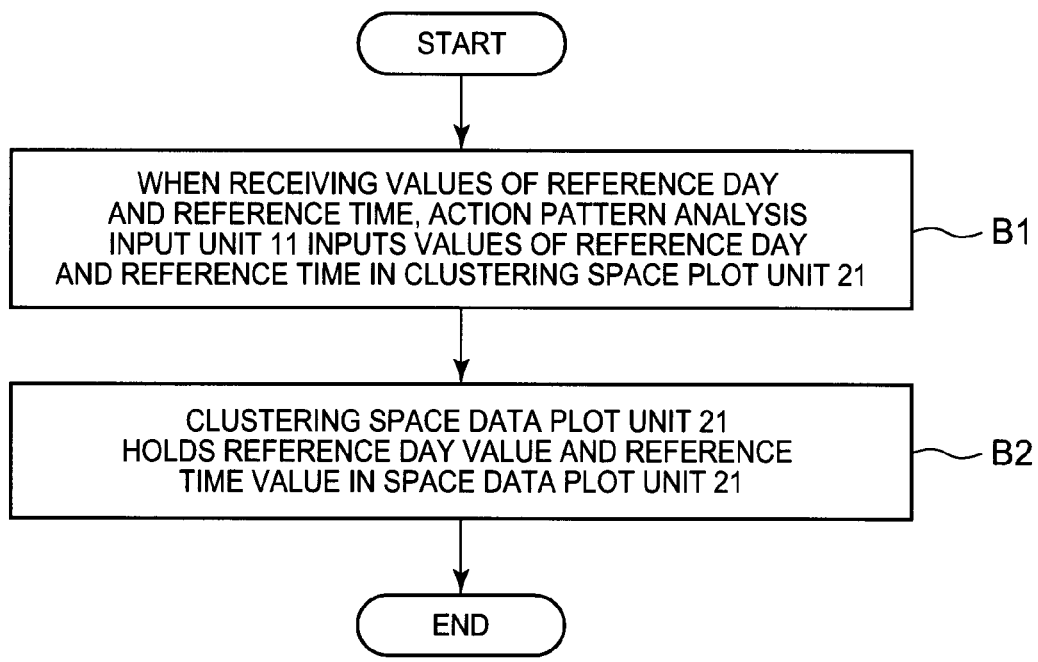
FIG. 9 It depicts a flowchart illustrating exemplary operations for setting a reference day and a reference time.

The operations of the action pattern analysis device according to the present exemplary embodiment will be described below. FIG. 7 and FIG. 8 are flowcharts illustrating exemplary operations of the action pattern analysis device. FIG. 9 is a flowchart illustrating exemplary operations for setting a reference day and a reference time.

At first, when being input with a position information log, the position information log input unit 10 inputs the position information log in the clustering space plot unit 21 (step A1 in FIG. 7). Then, when receiving the position information log, the clustering space plot unit 21 plots the position information log in the clustering space based on the previously-set reference day and reference time, and inputs the data plotted in the clustering space in the stay point cluster extraction unit 22 (step A2). A method for setting a reference day and a reference time will be described later.

Then, when receiving the data plotted in the clustering space from the clustering space plot unit 21, the stay point cluster extraction unit 22 multiplies the latitude and the longitude of the data plotted in the clustering space by the preset weight value, respectively (step A3). The stay point cluster extraction unit 22 may multiply the time by the preset weight value.

Then, the stay point cluster extraction unit 22 assumes all the data which is plotted in the clustering space and is multiplied by the weight value as initial clusters (step A4). Then, the stay point cluster extraction unit 22 determines whether a Euclidean distance between two points selected from all the clusters exceeds the set first Euclidean distance threshold (step A5). When the Euclidean distance between two points does not exceed the first Euclidean distance threshold (No in step A5), the processing proceeds to step A6, and when it exceeds (Yes in step A5), the processing proceeds to step A7.

When the Euclidean distance between two points does not exceed the first Euclidean distance threshold, the stay point cluster extraction unit 22 unifies the clusters with the shortest Euclidean distance between two points selected from all the clusters into one cluster. At this time, the stay point cluster extraction unit 22 unifies the clusters to contain times, latitudes and longitudes of the respective position information logs configuring the cluster. Further, the stay point cluster extraction unit 22 calculates a value of the center of gravity for latitudes and longitudes from the position information logs contained in the cluster in addition to the respective position information logs, and assumes the value as a new cluster data value. The stay point cluster extraction unit 22 holds the number of items of clustering space data contained in the unified cluster (step A6). After the processing in step A6, step A5 and its subsequent processing are performed.

On the other hand, when the Euclidean distance between two points exceeds the first Euclidean distance threshold, the stay point cluster extraction unit 22 determines a cluster containing more items of clustering space data than the set first cluster number threshold as a stay point. Then, the stay point cluster extraction unit 22 assumes the earliest time among the cluster data as a stay start time, and the latest time as a stay end time. The stay point cluster extraction unit 22 stores, in the stay point pattern storage unit 31, stay start time, stay end time, and a value of the center of gravity of the position information (latitude and longitude) in the cluster data (step A7).

Then, the stay point cluster extraction unit 22 inputs the data plotted in the clustering space received in step A2 and the stay point pattern data determined in step A7 into the stay point position information log removal unit 23 (step A8).

When receiving the data plotted in the clustering space and the stay point pattern data from the stay point cluster extraction unit 22, the stay point position information log removal unit 23 subtracts the data determined as a stay point contained in the stay point pattern data from the data plotted in the clustering space. The stay point position information log removal unit 23 inputs the rest data in the data plotted in the clustering space into the moving path cluster extraction unit 24 (step A9 in FIG. 8).

Then, when receiving the data which is plotted in the clustering space and from which the position information log determined as a stay point is removed from the stay point position information log removal unit 23, the moving path cluster extraction unit 24 multiplies the latitude and the longitude of the received data by the preset weight value, respectively (step A10). The moving path cluster extraction unit 24 may multiply the time by the present weight value.

Then, the moving path cluster extraction unit 24 assumes all the data plotted in the clustering space and multiplied by the weight value in step A10 as initial clusters (step A11). The moving path cluster extraction unit 24 determines whether the Euclidean distance between two points selected from all the clusters exceeds the second Euclidean distance threshold (step A12). When the Euclidean distance between two points does not exceeds the second Euclidean distance threshold (No in step A12), the processing proceeds to step A13, and when it exceeds (Yes in step A12), the processing proceeds to step A14.

When the Euclidean distance between two points does not exceeds the second Euclidean distance threshold, the moving path cluster extraction unit 24 unifies the clusters with the shortest Euclidean distance between two points selected from all the clusters into one cluster. At this time, the moving path cluster extraction unit 24 unifies the clusters to contain times, latitudes and longitudes of the respective position information logs configuring the cluster. Further, the moving path cluster extraction unit 24 calculates a value of the center of gravity for latitudes and longitudes from the position information logs contained in the cluster in addition to the respective position information logs, and assumes the value as a new cluster data value. The moving path cluster extraction unit 24 holds the number of items of clustering space data contained in the unified cluster (step A13). After the processing in step A13, step A12 and its subsequent processing are performed.

On the other hand, when the Euclidean distance between two points exceeds the second Euclidean distance threshold, the moving path cluster extraction unit 24 determines a cluster containing more items of clustering space data than the set second cluster number threshold as a moving path. Then, the moving path cluster extraction unit 24 assumes the earliest time in the cluster data as a moving start time, and the latest time as a moving end time. Further, the moving path cluster extraction unit 24 compares the position information (latitude and longitude) of the cluster with the position information (latitude and longitude) of the stay point contained in the stay point pattern data received in step A9. The moving path cluster extraction unit 24 determines a stay point with the shortest Euclidean distance relative to the position of the cluster and a stay point with the second shortest distance thereto as first close stay point identifier and second close stay point identifier, respectively. The moving path cluster extraction unit 24 stores moving start time, moving end time, first close stay point identifier and second close stay point identifier in the moving path pattern storage unit 32 (step A14).

The operations for setting a reference day and a reference time will be described below. At first, when being input with the values of a reference day and a reference time by the user, for example, the action pattern analysis reference input unit 11 inputs the input values of the reference day and the reference time into the clustering space plot unit 21 (step B1 in FIG. 9). Then, when receiving the values of the reference day and the reference time from the action pattern analysis reference input unit 11, the clustering space data plot unit 21 holds the values of the reference day and the reference time in the clustering space data plot unit 21 (step B2).

As described above, according to the present exemplary embodiment, the clustering space plot unit 21 plots a position information log on the 3D space defined by at least latitude, longitude and time. Then, the stay point cluster extraction unit 22 weights a position information log so that a Euclidean distance in the time direction relative to the latitude-longitude plan is easily determined as short, and clusters the position information log thereby to extract a stay point. The stay point position information log removal unit 23 extracts a non-stay point in which the position information log extracted as a stay point is removed from the position information logs plotted on the space. Then, the moving path cluster extraction unit 24 weights a position information log at the non-stay point so that a Euclidean distance in the time direction relative to the latitude-longitude plan is easily determined as long, and clusters the position information log thereby to extract a user's moving path. With the structure, also when position information is measured at longer time intervals or when position information is irregularly measured, a user's action pattern can be accurately analyzed.

For example, as illustrated in FIG. 3(*a*) and FIG. 3(*b*), it is difficult to determine, by the position information logs for one day, what is the place indicated by one record for the user. However, the position information logs illustrated in FIG. 3(*a*) and FIG. 3(*b*) are plotted on a clustering space illustrated in FIG. 3(*c*) so that the records are confirmed as continuing on the points where the records stay longer and on the moving path between the stay points. Therefore, rough position information at a non-measured time can be interpolated.

Second Exemplary Embodiment

Figure 10:
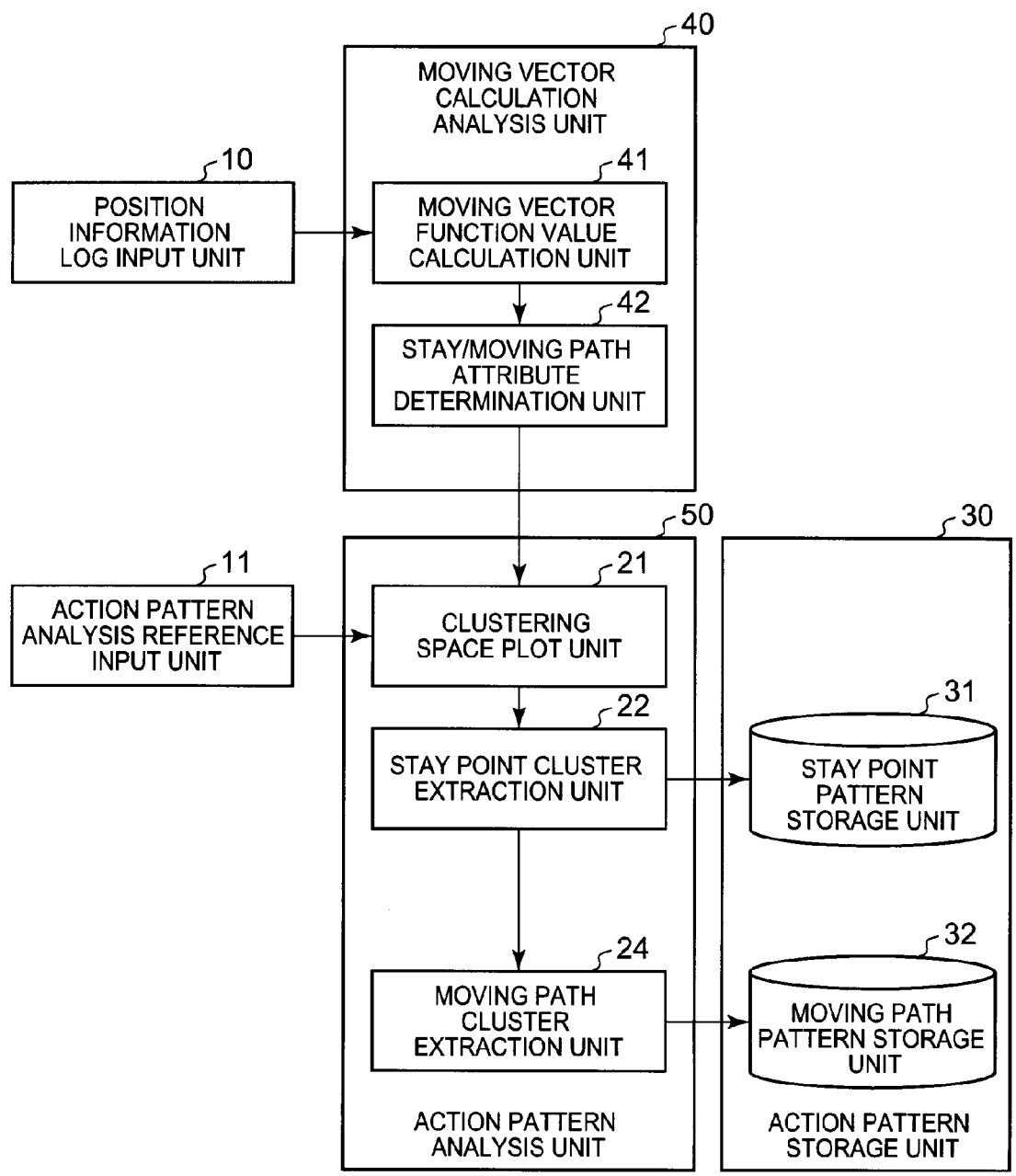
FIG. 10 It depicts a block diagram illustrating an exemplary structure of an action pattern analysis device according to a second exemplary embodiment of the present invention.

An action pattern analysis device according to a second exemplary embodiment of the present invention will be described below. In the present exemplary embodiment, there will be described a method for enhancing an accuracy of determining a stay point cluster and a moving path cluster when a large amount of position information logs are present. FIG. 10 is a block diagram illustrating an exemplary structure of the action pattern analysis device according to the second exemplary embodiment of the present invention. The action pattern analysis device according to the present exemplary embodiment comprises the position information log input unit 10, the action pattern analysis reference input unit 11, an action pattern analysis unit 50, the action pattern storage unit 30 and a moving vector calculation analysis unit 40.

The contents of the action pattern analysis reference input unit 11 and the action pattern storage unit 30 are the same as those in the first exemplary embodiment, and thus an explanation thereof will be omitted.

When receiving a position information log with a record of [latitude, longitude, time], the position information log input unit 10 inputs the position information log in a moving vector function value calculation unit 41. The time may be a measurement date/time, and the latitude and longitude may be a measurement place.

The moving vector calculation analysis unit 40 includes the moving vector function value calculation unit 41 and a stay/moving path attribute determination unit 42. The moving vector function value calculation unit 41 sorts the input records of the position information logs in a time sequence of the time contained in the position information logs. Then, the moving vector function value calculation unit 41 calculates a differential value between the preceding and subsequent records sorted in a time sequence as a vector function value. In the following description, the vector function value may be denoted as moving vector function value. The preceding and subsequent records mean two adjacent records when the records of the position information logs are sorted. The differential value contains a time difference in measurement date/time contained in the position information logs, and a distance between the measurement places. The differential value may contain a travelling direction angle indicating a travelling direction between the measurement places.

The vector function value may be defined as $(t_1, t_2, r, \theta)$. $t_1$ indicates a time when a record is recorded. $t_2$ indicates a difference between when the record is recorded and when a next record is recorded (time difference in measurement date/time). r indicates a distance between where the record is recorded and where a next record is recorded (distance between the measurement places). $\theta$ indicates a travelling direction angle indicating a travelling direction from where the record is recorded toward where a next record is recorded.

Herein, the latitude at the coordinate indicated by the position information log is assumed as $X_i$ and the longitude is assumed as $Y_i$, and the coordinates of two points to be compared are assumed as $(X_1, Y_1)$ and $(X_2, Y_2)$ respectively. At this time, the moving vector function value calculation unit 41 calculates a distance up to where a next record is recorded as $r=((X_2-X_1)^2+(Y_2-Y_1)^2)^{1/2}$. Further, the moving vector function value calculation unit 41 calculates the travelling direction angle as $\theta=\arg((Y_2-Y_1)/(X_2-X_1))$. Then, the moving vector function value calculation unit 41 inputs the vector function values of all the records obtained by the calculations in the stay/moving path attribute determination unit 42.

Figure 11:
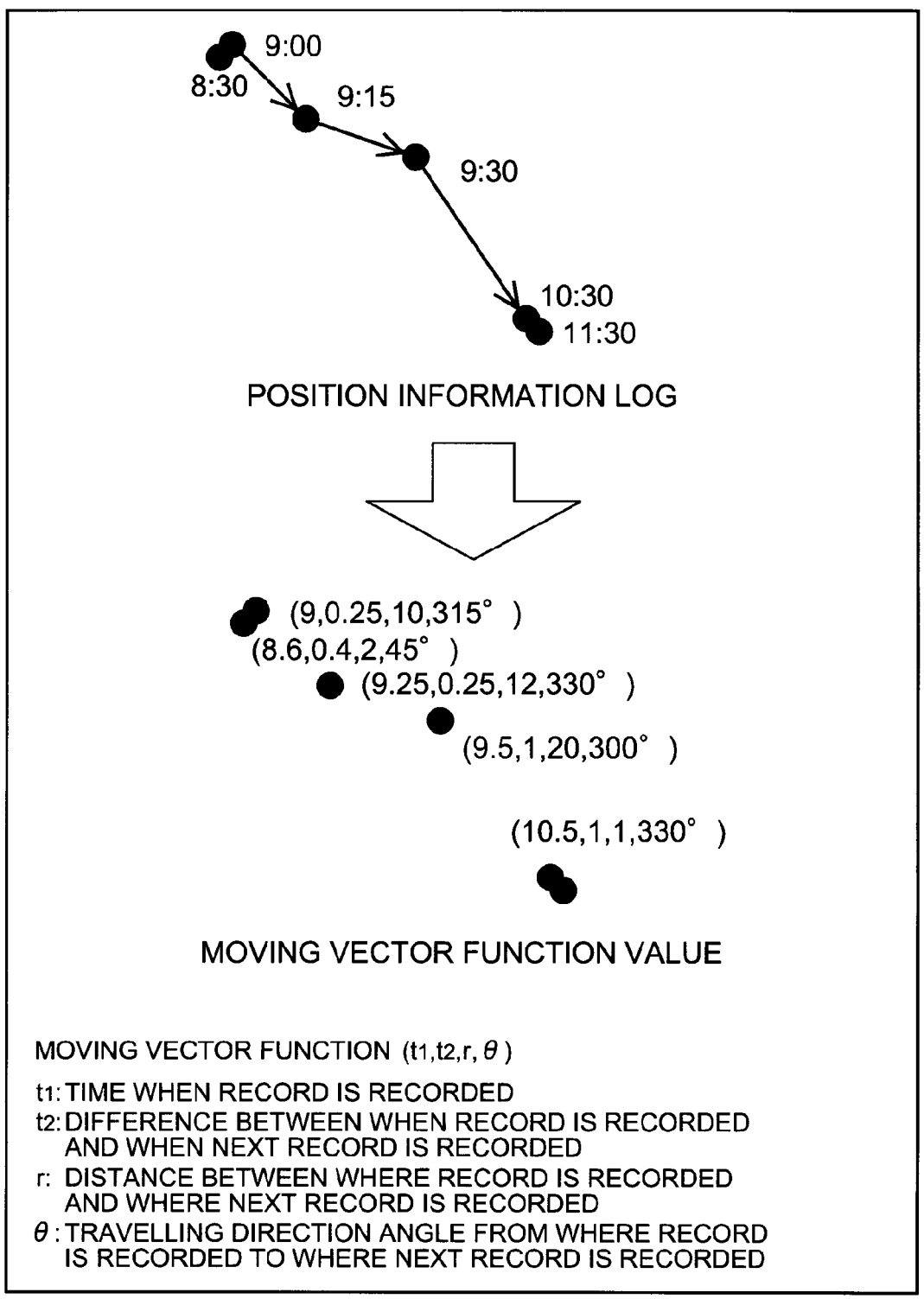
FIG. 11 It depicts an explanatory diagram illustrating exemplary moving vector function values.

FIG. 11 is an explanatory diagram illustrating exemplary moving vector function values. The example illustrated in FIG. 11 indicates that the position information logs recorded at 8:30, 9:00, 9:15, 9:30, 10:30 and 11:30 in a time sequence are present. At this time, the moving vector function value calculation unit 41 calculates a vector function value of the position information log recorded at 11:30 as (9, 0.25, 10, 315°). Herein, a time and a time difference are "hour"-based. The moving vector function value calculation unit 41 may calculate the values of r and θ based on the above equations. For the position information log recorded at 11:30, a vector function value of the position information log recorded at 11:30 is not calculated since its next-recorded record is not present.

When receiving the vector function values of all the records from the moving vector function value calculation unit 41, the stay/moving path attribute determination unit 42 determines whether each record indicates stay, indicates moving path, or cannot be determined as stay or moving path. The record indicating stay means a record contained in a stay point, the record indicating a moving path means a record contained in a non-stay point. An attribute of the record indicating stay will be denoted as stay attribute below. An attribute of the record indicating moving path will be denoted as moving attribute.

Specifically, the stay/moving path attribute determination unit 42 determines an attribute of each record indicating the vector function value received from the moving vector function value calculation unit 41 by use of a preset stay point allowable distance R and an effective record threshold time T.

When the value of $t_2$ contained in the moving vector function value of the record (or a difference relative to when a next record is recorded) is larger than the effective record threshold time T, the stay/moving path attribute determination unit 42 cannot determine an attribute of the record. On the other hand, when the value of $t_2$ contained in the moving vector function value of the record is smaller than the effective record threshold time T, the stay/moving path attribute determination unit 42 compares the value of r contained in the moving vector function value with the value of the stay point allowable distance R.

When the value of r contained in the moving vector function value is smaller than the value of the stay point allowable distance R, the stay/moving path attribute determination unit 42 determines the target record as having the stay attribute. On the other hand, when the value of r is larger than the value of the stay point allowable distance R, the stay/moving path attribute determination unit 42 determines the target record as having the moving path attribute. Then, the stay/moving path attribute determination unit 42 inputs the record determined as stay attribute or moving attribute in the clustering space plot unit 21.

The action pattern analysis unit 50 includes the clustering space plot unit 21, the stay point cluster extraction unit 22 and the moving path cluster extraction unit 24. That is, the action pattern analysis unit 50 according to the present exemplary embodiment is different from the action pattern analysis unit 20 according to the first exemplary embodiment in that it does not include the stay point position information log removal unit 23.

The clustering space plot unit 21 plots a position information log to be analyzed in the clustering space similarly as in the first exemplary embodiment. Specifically, at first, the clustering space plot unit 21 extracts a position information log at a set day (or a day reference) with a preset time (or a time reference) as a date base. The method for extracting a position information log based on a time reference and a day reference is the same as the method according to the first exemplary embodiment.

The clustering space plot unit 21 may be directly input with a position information log from the position information log input unit 10. The stay/moving path attribute determination unit 42 may input the position information log input in the moving vector calculation analysis unit 40 into the clustering space plot unit 21.

According to the present exemplary embodiment, the clustering space plot unit 21 plots, in the clustering space, a record in which a travelling direction angle received from the stay/moving path attribute determination unit 42 is added to a position information log containing latitude, longitude and time. The travelling direction angle is a value corresponding to the time contained in the position information log. That is, the clustering space plot unit 21 plots a record containing [latitude, longitude, time, travelling direction angle] in the 4D clustering space. The method for plotting the record in the clustering space by the clustering space plot unit 21 is the same as in the first exemplary embodiment. Then, the clustering space plot unit 21 inputs the plotted data in the stay point cluster extraction unit 22.

The stay point cluster extraction unit 22 clusters clustering space data and extracts a stay point as in the first exemplary embodiment. According to the present exemplary embodiment, when receiving the data plotted in the clustering space from the clustering space plot unit 21, the stay point cluster extraction unit 22 clusters only the records determined as the stay attribute in the stay/moving path attribute determination unit 42.

The stay point cluster extraction unit 22 multiplies the values indicating latitude and longitude of the data plotted in the clustering space by a preset value, respectively. The data which is plotted in the clustering space and is determined as the stay attribute among all the data multiplied by the preset weight value is assumed as initial cluster.

Then, the stay point cluster extraction unit 22 determines whether a Euclidean distance between two points selected from the clusters exceeds a preset Euclidean distance threshold. When the Euclidean distance does not exceed the Euclidean distance threshold, the stay point cluster extraction unit 22 unifies the clusters with the shortest Euclidean distance between two points selected from all the clusters into one cluster.

At this time, the stay point cluster extraction unit 22 unifies the clusters to contain times, latitudes and longitudes of the respective position information logs configuring the cluster. Further, the stay point cluster extraction unit 22 calculates a value of the center of gravity for latitudes and longitudes from the position information logs contained in the cluster in addition to the respective position information logs, and assumes the value as a new cluster data value. The stay point cluster extraction unit 22 holds the number of items of clustering space data contained in the unified cluster.

On the other hand, when the Euclidean distance between two points exceeds the Euclidean distance threshold, the stay point cluster extraction unit 22 determines a cluster containing more items of clustering space data than the set cluster number threshold as a stay point. Then, the stay point cluster extraction unit 22 assumes the earliest time among the data in the cluster as a stay start time, and assumes the latest time as a stay end time. Then, the stay point cluster extraction unit 22 stores the stay start time, the stay end time, and the value of the center of gravity of the latitudes and longitudes of the data in the cluster in the stay point pattern storage unit 31.

The stay point cluster extraction unit 22 inputs the data received from the clustering space plot unit 21 in the moving path cluster extraction unit 24.

That is, the clustering method by the stay point cluster extraction unit 22 according to the present exemplary embodiment is the same as in the first exemplary embodiment. The present exemplary embodiment is different from the first exemplary embodiment in that the stay point cluster extraction unit 22 clusters only the records determined as the stay attribute.

As in the first exemplary embodiment, the moving path cluster extraction unit 24 clusters clustering space data, and extracts a time zone and a moving path in which the terminal user frequently moves. The present exemplary embodiment is different from the first exemplary embodiment in that the data determined as the moving attribute is processed as an initial cluster.

In the first exemplary embodiment, the stay point position information log removal unit 23 subtracts the data determined as a stay point contained in the stay point pattern data from the data plotted in the clustering space. Then, the stay point position information log removal unit 23 inputs the rest data in the data plotted in the clustering space into the moving path cluster extraction unit 24. On the other hand, according to the present exemplary embodiment, a record determined as the stay attribute or the moving path attribute by the stay/moving path attribute determination unit 42 is input into the clustering space plot unit 21. Thus, even when the data determined as a stay point by the stay point position information log removal unit 23 is not subtracted from the data plotted in the clustering space, the moving path cluster extraction unit 24 can identify the data determined as the moving attribute.

That is, both the stay point position information log removal unit 23 according to the first exemplary embodiment and the moving vector calculation unit 40 (more specifically, the moving vector function value calculation unit 41 and the stay/moving path attribute determination unit 42) according to the present exemplary embodiment have the function of extracting a non-stay point. Further, since the data is narrowed, the moving vector calculation unit 40 according to the present exemplary embodiment can enhance an accuracy of determining a stay point cluster and a moving path cluster even when a number of position information logs are present, in addition to the effects of the first exemplary embodiment.

At first, when receiving the data from the stay point cluster extraction unit 22, the moving path cluster extraction unit 24 multiplies the latitude and the longitude of the received data by the preset weight value, respectively.

A moving path travelling direction will be considered in the present exemplary embodiment. A distance function is defined as in the following Equation 1 by use of the four variables of latitude, longitude, time and travelling direction angle. In the distance function defined below, $k_2$ and $k_3$ are defined for time and travelling direction angle, respectively, with reference to latitude and longitude.

$$(X_1-X_2)^2+(Y_1-Y_2)^2+k_2(Z_1-Z_2)^2+k_3(|\theta_1-\theta_2|)^2 \text{ where } |\theta_1-\theta_2|<180°$$

$$(X_1-X_2)^2+(Y_1-Y_2)^2+k_2(Z_1-Z_2)^2+k_3(|\theta_1-\theta_2|-180)^2 \text{ where } |\theta_1-\theta_2|>180° \quad \text{(Equation 1)}$$

Herein, data determined as the moving attribute among all the items of data multiplied by the defined weight values $k_2$ and $k_3$ is assumed as initial clusters. The moving path cluster extraction unit 24 determines whether a Euclidean distance between two points selected from the clusters exceeds the set Euclidean distance threshold. When the Euclidean distance does not exceed the threshold, the moving path cluster extraction unit 24 unifies the clusters with the shortest Euclidean distance between two points selected from the clusters into one cluster.

At this time, the moving path cluster extraction unit 24 unifies the clusters to contain times, latitudes and longitudes of the respective position information logs configuring the cluster. Further, the moving path cluster extraction unit 24 calculates a value of the center of gravity for latitudes and longitudes from the position information logs contained in the cluster in addition to the respective position information logs, and assumes the value as a new cluster data value. The moving path cluster extraction unit 24 holds the number of items of clustering space data contained in the unified cluster.

On the other hand, when the Euclidean distance between two points exceeds the Euclidean distance threshold, the moving path cluster extraction unit 24 determines a cluster containing more items of clustering space data than the set cluster number threshold as a moving path. Then, the moving path cluster extraction unit 24 assumes the earliest time among the data in the cluster as a moving start time, and assumes the latest time as a moving end time.

Further, the moving path cluster extraction unit 24 compares the position information (latitude and longitude) of the cluster with the position information (latitude and longitude) at a stay point contained in the stay point pattern data received from the stay point cluster extraction unit 22. Then, the moving path cluster extraction unit 24 determines a stay point with the shortest Euclidean distance relative to the position of the cluster and a stay point with the second shortest distance as first close stay point identifier and second close stay point identifier, respectively. The moving path cluster extraction unit 24 stores the moving start time, the moving end time, the first close stay point identifier and the second close stay point identifier in the moving path pattern storage unit 32.

That is, the moving path cluster extraction unit 24 according to the present exemplary embodiment is different from the moving path cluster extraction unit 24 according to the first exemplary embodiment in that it performs clustering in consideration of a difference in the travelling direction angle. Other points are the same as in the first exemplary embodiment. When the moving path travelling direction is not considered, the moving path cluster extraction unit 24 may perform clustering based on the measurement position and the measurement date/time of the user as in the first exemplary embodiment.

As described above, according to the present exemplary embodiment, the moving vector function value calculation unit 41 calculates, as the differential values between two adjacent position information logs sorted in an order of measurement date/time contained in the position information logs, a time difference in measurement date/time contained in the position information logs, a distance between the measurement places, and a travelling direction angle indicating a travelling direction between the measurement places. The stay/moving path attribute determination unit 42 determines whether an attribute of the position information log has the stay attribute based on the time difference in measurement date/time and the distance between the measurement places. Then, the stay point cluster extraction unit 22 clusters the position information logs determined as having the stay attribute thereby to extract a stay point.

According to the present exemplary embodiment, the stay/moving path attribute determination unit 42 determines whether an attribute of the position information log has the moving attribute based on the time difference in measurement date/time and the distance between the measurement places. The clustering space plot unit 21 plots a record in which a position information log containing a user's measurement position and measurement date/time is added with a travelling direction angle on the 4D space defined by at least latitude, longitude, time and travelling direction angle. The moving path cluster extraction unit 24 extracts a user's moving path by clustering the position information logs determined as having the moving path attribute.

With the structure, in addition to the effects of the first exemplary embodiment, an accuracy of determining a stay point cluster and a moving path cluster can be enhanced even when a large number of position information logs are present.

That is, according to the present exemplary embodiment, a record which cannot be determined as stay or moving path (or a record which is neither stay attribute or moving attribute) is not to be clustered. In this way, the records to be clustered are reduced, thereby enhancing the clustering accuracy.

Third Exemplary Embodiment

Figure 12:
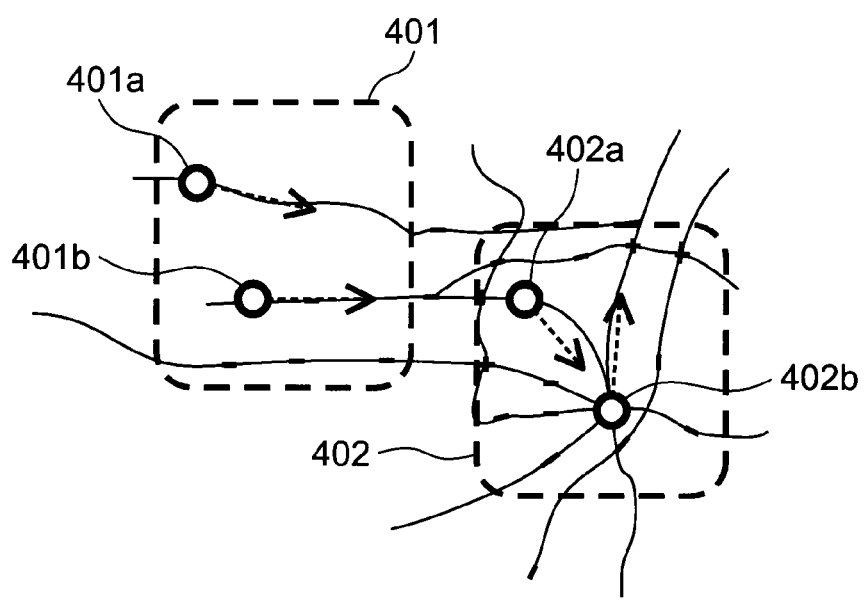
FIG. 12 It depicts an explanatory diagram illustrating exemplary sets of position information logs.

An action pattern analysis device according to a third exemplary embodiment of the present invention will be described below. A method for enhancing an accuracy of classifying moving path clusters will be described according to the present exemplary embodiment. FIG. 12 is an explanatory diagram illustrating exemplary sets of position information logs. In FIG. 12, a dotted arrow indicates a travelling direction contained in a position information log. The example illustrated in FIG. 12 indicates that a position information log 401a and a position information log 401b contained in a position information log group 401 surrounded by a dashed line have the same travelling direction but use different paths. The example illustrated in FIG. 12 indicates that a position information log 402a and a position information log 402b contained in a position information log group 402 surrounded by a dashed line largely change in the travelling direction on the same moving path. According to the present exemplary embodiment, there will be described a processing of enhancing an accuracy of classifying a different path contained in the position information log group 401 as a different moving path cluster and classifying the same moving paths contained in the position information log group 401 as the same moving path cluster.

Figure 13:
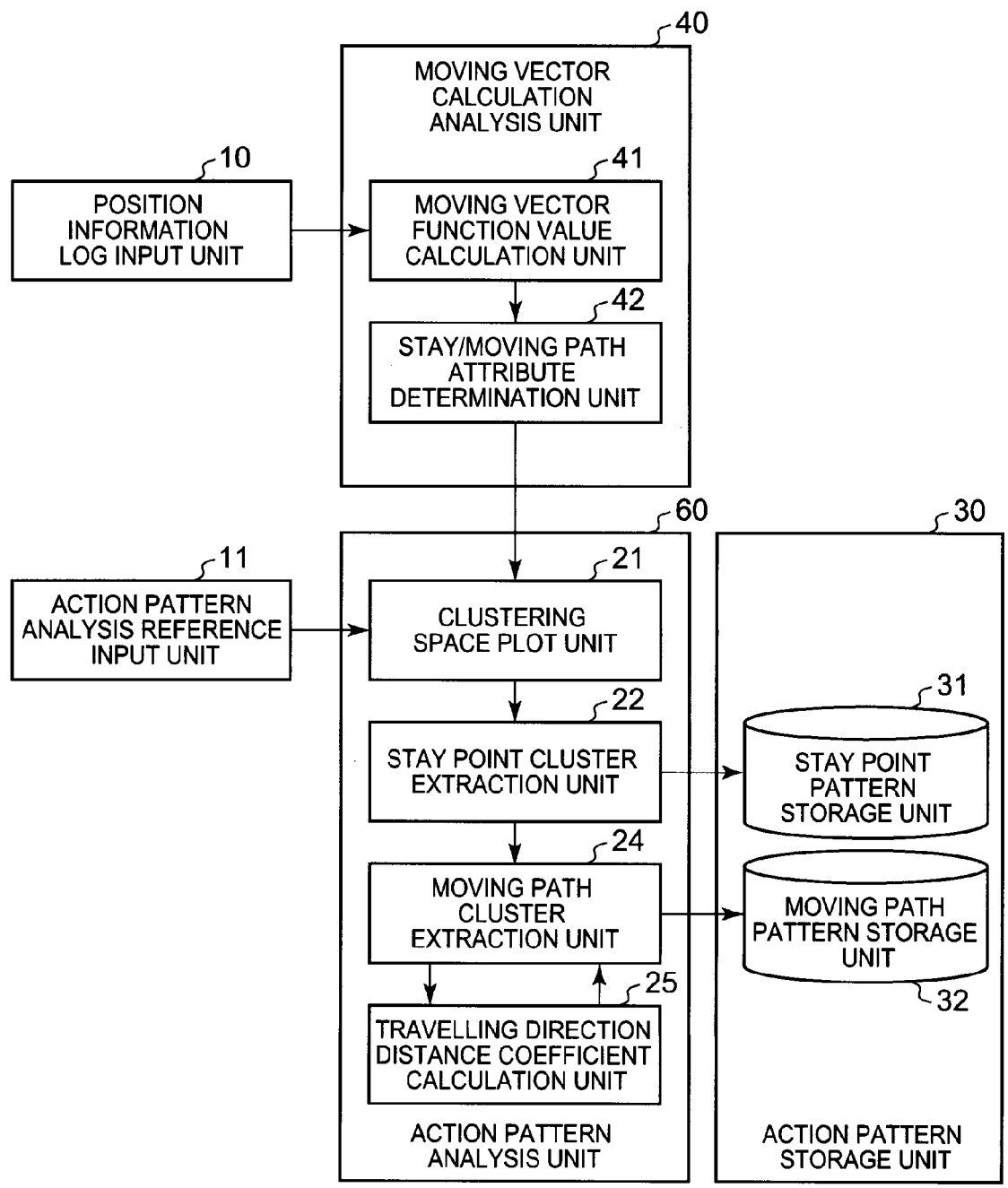
FIG. 13 It depicts a block diagram illustrating an exemplary structure of an action pattern analysis device according to a third exemplary embodiment of the present invention.

FIG. 13 is a block diagram illustrating an exemplary structure of the action pattern analysis device according to the third exemplary embodiment of the present invention. The action pattern analysis device according to the present exemplary embodiment comprises the position information log input unit 10, the action pattern analysis reference input unit 11, an action pattern analysis unit 60, the action pattern storage unit 30, and the moving vector calculation analysis unit 40.

The position information log input unit 10, the action pattern analysis reference input unit 11, the action pattern storage unit 30, and the contents of the moving vector calculation analysis unit 40 including the moving vector function value calculation unit 41 and the stay/moving path attribute determination unit 42 are the same as those in the second exemplary embodiment, and an explanation thereof will be omitted.

The action pattern analysis unit 60 includes the clustering space plot unit 21, the stay point cluster extraction unit 22, the moving path cluster extraction unit 24 and a travelling direction distance coefficient calculation unit 25. That is, the action pattern analysis unit 60 according to the present exemplary embodiment is different from the action pattern analysis unit 50 according to the second exemplary embodiment in that it includes the travelling direction distance coefficient calculation unit 25.

The clustering space plot unit 21 plots a position information log to be analyzed in the clustering space as in the second exemplary embodiment. Specifically, the clustering space plot unit 21 first extracts a position information log at a set day (or a day reference) with a preset time (or a time reference) as a date base. The method for extracting a position information log based on a time reference and a day reference is the same as the method according to the second exemplary embodiment.

The clustering space plot unit 21 may be directly input with a position information log form the position information log input unit 10. The stay/moving path attribute determination unit 42 may input a position information log input in the moving vector calculation analysis unit 40 into the clustering space plot unit 21.

According to the present exemplary embodiment, the clustering space plot unit 21 plots a position information log containing latitude, longitude and time in the clustering space. The method for plotting the record in the clustering space by the clustering space plot unit 21 is the same as in the first exemplary embodiment. The clustering space plot unit 21 inputs the plotted data in the stay point cluster extraction unit 22.

The stay point cluster extraction unit 22 clusters clustering space data and extracts a stay point as in the second exemplary embodiment. According to the present exemplary embodiment, when receiving the data plotted in the clustering space from the clustering space plot unit 21, the stay point cluster extraction unit 22 clusters only the records determined as the stay attribute by the stay/moving path attribute determination unit 42.

The stay point cluster extraction unit 22 multiplies the values indicating latitude and longitude of the data plotted in the clustering space by a preset weight value, respectively. Then, the data which is plotted in the clustering space and is determined as the stay attribute among all the items of data multiplied by the preset weight value is assumed as an initial cluster.

The stay point cluster extraction unit 22 determines whether a Euclidean distance between two points selected from the clusters exceeds a preset Euclidean distance threshold. When the Euclidean distance does not exceed the Euclidean distance threshold, the stay point cluster extraction unit 22 unifies the clusters with the shortest Euclidean distance between two points selected from all the clusters into one cluster.

At this time, the stay point cluster extraction unit 22 unifies the clusters to contain times, latitudes, and longitudes of the respective position information logs configuring the cluster. Further, the stay point cluster extraction unit 22 calculates a value of the center of gravity for latitudes and longitudes from the position information logs contained in the cluster in addition to the respective position information logs, and assumes the value as a new cluster data value. The stay point cluster extraction unit 22 holds the number of items of clustering space data contained in the unified cluster.

On the other hand, when the Euclidean distance between two points exceeds the Euclidean distance threshold, the stay point cluster extraction unit 22 determines a cluster containing more items of clustering space data than a set cluster number threshold as a stay point. The stay point cluster extraction unit 22 assumes the earliest time among the data in the cluster as a stay start time, and assumes the latest time as a stay end time. Then, the stay point cluster extraction unit 22 stores the stay start time, the stay end time, and the value of the center of gravity for latitudes and longitudes of the data in the cluster into the stay point pattern storage unit 31.

The stay point cluster extraction unit 22 inputs the data received from the clustering space plot unit 21 in the moving path cluster extraction unit 24.

That is, the clustering method by the stay point cluster extraction unit 22 according to the present exemplary embodiment is the same as in the second exemplary embodiment. While the clustering space plot unit 21 plots a record containing [latitude, longitude, time, travelling direction angle] in the 4D clustering space in the second exemplary embodiment, the present exemplary embodiment is different from the second exemplary embodiment in that the clustering space plot unit 21 plots a record containing [latitude, longitude, time] in the 3D clustering space for clustering.

The moving path cluster extraction unit 24 clusters the clustering space data, and extracts a time zone and a moving path in which the terminal user frequently moves. The present exemplary embodiment is different from the second exemplary embodiment in that the moving path cluster extraction unit 24 performs clustering in consideration of a relationship between the travelling direction indicated by the position information log and the azimuth between the position information logs.

Figure 14:
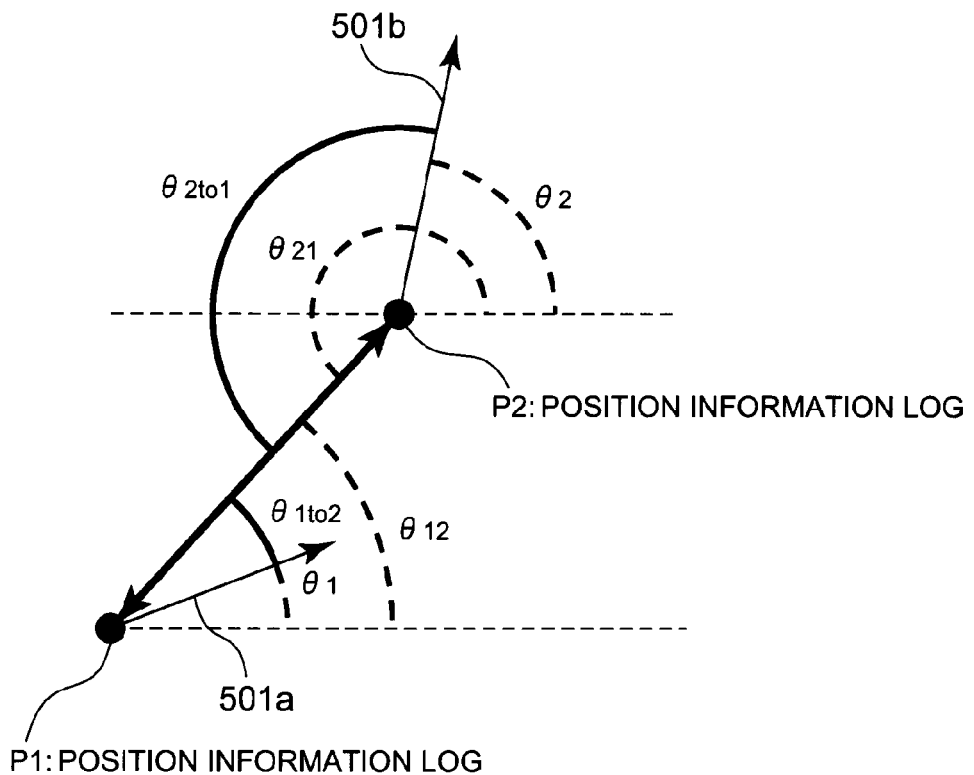
FIG. 14 It depicts an explanatory diagram illustrating exemplary relationships between travelling directions indicated by position information logs and azimuths of the position information logs.

FIG. 14 is an explanatory diagram illustrating an exemplary relationship between a travelling direction indicated by a position information log and an azimuth between the position information logs. The example illustrated in FIG. 14 indicates that arrows 501a and 501b indicate the travelling directions of the points P1 and P2 indicating the position information logs, respectively.

In the present exemplary embodiment, the travelling direction distance coefficient calculation unit 25 described later calculates a travelling direction coefficient $w_{12}$ from a travelling direction angle $\theta_1$ of P1 and an azimuth $\theta_{12}$ from the original point P1 to P2, and the moving path cluster extraction unit 24 multiplies a value of the Euclidean distance by $w_{12}$. Similarly, the travelling direction distance coefficient calculation unit 25 calculates a travelling direction coefficient $w_{21}$ from a travelling direction angle $\theta_2$ of P2 and an azimuth $\theta_{21}$ from the original point P1 to P2, and the moving path cluster extraction unit 24 multiplies a value of the Euclidean distance by $w_{21}$.

Herein, the travelling direction distance coefficient is a coefficient which is smaller as the value of an angle formed by a travelling direction from a measurement position indicated by a position information log and a direction connecting two measurement positions is smaller, and is calculated by the method described later. The moving path cluster extraction unit 24 uses the calculated value to perform a processing of assuming data determined as the moving attribute as an initial cluster. The azimuth calculation method will be also described later.

The travelling direction distance coefficient calculation unit 25 calculates, per position information log, a coefficient (or a travelling direction distance coefficient) which is smaller as the value of an angle formed by a travelling direction from a measurement position indicated by each position information log and a direction connecting measurement positions indicated by two position information logs on the basis of the two position information logs. Specifically, the travelling direction distance coefficient calculation unit 25 calculates an angle formed by a vector from the original point to another point (specifically, a vector indicating a direction between two measurement positions) and a moving direction vector calculated by the moving vector function value calculation unit 41 (specifically, a vector indicating a travelling direction from a measurement position) for the two position information logs, and determines a value of the travelling direction distance coefficient. The travelling direction distance coefficient calculation unit 25 receives the position information logs from the moving path cluster extraction unit 24, and calculates a travelling direction distance coefficient.

A moving direction vector between two position information logs is generally different. The travelling direction distance coefficient calculation unit 25 calculates an angle to be formed with each position information log as the original point.

It is assumed herein that the longitude at the coordinate indicated by the position information log illustrated in FIG. 14 is $X_i$ and the longitude is $Y_i$, and the coordinates of the two points P1 and P2 to be compared are assumed as $(X_1, Y_1)$ and $(X_2, Y_2)$ respectively. The azimuth of the moving direction vector 501a of P1 is assumed as $\theta_1$, and the azimuth of the moving direction vector 501b of p2 is assumed as $\theta_2$. At this time, the azimuth of P2 for the original point P1 is defined as in the following Equation 2.

$$\theta_{12} = \arg((Y_2-Y_1)/(X_2-X_1)) \quad \text{(Equation 2)}$$

An angle $\theta_{1to2}$ formed by the vector from the original point P1 to P2 and the moving vector 501a of P1 calculated in the moving vector function value calculation unit 41 is defined as in the following Equation 3.

$$\theta_{1to2} = \min\{|\theta_1-\theta_{12}|, 360-|\theta_1-\theta_{12}|\} \quad \text{(Equation 3)}$$

At this time, the travelling direction distance coefficient calculation unit 25 uses $\theta_{1to2}$ calculated in the Equation 2 and the Equation 3 to find the travelling direction distance coefficient $w_{12}$. The travelling direction distance coefficient calculation unit 25 may use the following Equation 4 to calculate the travelling direction distance coefficient $w_{12}$, for example.

$$w_{12} = -\cos\theta_{1to2} \quad \text{(Equation 4)}$$

An equation to be used for calculating the travelling direction coefficient $w_{12}$ is not limited to the Equation 4. There may be used any other equation meeting the condition that a value of the travelling direction distance coefficient which is smaller as a value of an angle formed by a travelling direction from a measurement position indicated by a position information log and a direction between two measurement positions is smaller and which is a continuous function in a range capable of being taken by the angle formed by both the directions always takes a positive value irrespective of the angle formed by both the directions.

In this way, the travelling direction distance coefficient may be defined by a value of an angle formed by a travelling direction contained in a moving vector function value calculated by the moving vector function value calculation unit 41 and an azimuth between two position information logs for the two position information logs.

Similarly, the azimuth of P1 for the original point P2 is defined as in the following Equation 5.

$$\theta_{21} = \arg((Y_1-Y_2)/(X_1-X_2)) \quad \text{(Equation 5)}$$

An angle $\theta 2_{to1}$ formed by the vector of P1 for the original point P2 and the moving direction vector 501b of P2 calculated in the moving vector function value calculation unit 41 is also defined in the following Equation 6 similarly to the Equation 3.

$$\theta_{2to1} = \min\{|\theta_2 - \theta_{21}|, 360 - |\theta_2 - \theta_{21}|\} \quad \text{(Equation 6)}$$

At this time, the travelling direction distance coefficient calculation unit 25 uses $\theta_{2to1}$ calculated in the Equation 5 and the Equation 6 to find a travelling direction distance coefficient $w_{21}$. The travelling direction distance coefficient calculation unit 25 may use the following Equation 7 to find the travelling direction distance coefficient $w_{21}$, for example.

$$w_{21} = 1 - \cos \theta_{2to1} \quad \text{(Equation 7)}$$

The travelling direction distance coefficient calculation unit 25 notifies the calculated travelling direction distance coefficients $w_{12}$ and $w_{21}$ to the moving path cluster extraction unit 24.

When receiving the data from the stay point cluster extraction unit 22, the moving path cluster extraction unit 24 passes a position information log containing at least [latitude, longitude, travelling direction angle] to the travelling direction distance coefficient calculation unit 25, and receives the travelling direction distance coefficients from the travelling direction distance coefficient calculation unit 25.

According to the present exemplary embodiment, when a value indicating a distance between the two points (P1, P2) of the position information logs is calculated, the value indicating the distance between the two points is different in consideration of the moving path travelling direction between when the distance is calculated with reference to P1 and when the distance is calculated with reference to P2.

Thus, according to the present exemplary embodiment, the four variables of latitude, longitude, time and travelling direction distance coefficient are used to define the distance function as in the following Equation 8. In the distance function defined in the following Equation 8, $k_2$ is defined relative to time with reference to latitude and longitude.

$$w_{12}\{(X_1-X_2)^2+(Y_1-Y_2)^2+k_2(Z_1-Z_2)^2\} \quad \text{(Equation 8)}$$

Herein, it is assumed that data determined as the moving attribute among all the items of data multiplied by the defined weight value $k_2$ is an initial cluster. That is, the weight value $k_2$ by which a Euclidian distance in a time direction is easily determined as long is previously set with reference to latitude and longitude. The moving path cluster extraction unit 24 calculates a Euclidian distance between position information logs by multiplying latitude and longitude contained in each position information log by the weight value $k_2$, respectively. The moving path cluster extraction unit 24 weights the calculated Euclidean distance by multiplication of the travelling direction distance coefficient.

Then, the moving path cluster extraction unit 24 determines whether a Euclidean distance between two points selected from the clusters exceeds the set Euclidean distance threshold. When the Euclidean distance does not exceed the threshold, the moving path cluster extraction unit 24 unifies the clusters with the shortest Euclidean distance between two points selected from the clusters into one cluster.

At this time, the moving path cluster extraction unit 24 unifies the clusters to contain times, latitudes and longitudes of the respective position information log configuring the cluster. Further, the moving path cluster extraction unit 24 calculates a value of the center of gravity for latitudes and longitudes from the position information logs contained in the cluster in addition to the respective position information logs, and assumes the value as a new cluster data value. The moving path cluster extraction unit 24 holds the number of items of clustering space data contained in the unified cluster.

On the other hand, when the Euclidean distance between two points exceeds the Euclidean distance threshold, the moving path cluster extraction unit 24 determines a cluster containing more items of clustering space data than the set cluster number threshold as a moving path. Then, the moving path cluster extraction unit 24 assumes the earliest time among the data in the cluster as a moving start time, and assumes the latest time as a moving end time.

Further, the moving path cluster extraction unit 24 compares the position information (latitude and longitude) of the cluster with the position information (latitude and longitude) of the stay point contained in the stay point pattern data received from the stay point cluster extraction unit 22. The moving path cluster extraction unit 24 determines a stay point with the shortest Euclidean distance relative to the position in the cluster and a stay point with the second shortest distance as first close stay point identifier and second close stay point identifier, respectively. Then, the moving path cluster extraction unit 24 stores the moving start time, the moving end time, the first close stay point identifier, and the second close stay point identifier in the moving path pattern storage unit 32.

That is, the moving path cluster extraction unit 24 according to the present exemplary embodiment is different from the moving path cluster extraction unit 24 according to the second exemplary embodiment in that it calculates a Euclidean distance of a record containing [latitude, longitude, time] and clusters the same. The moving path cluster extraction unit 24 according to the present exemplary embodiment calculates a Euclidean distance between two position information logs with each position information log as the start point, and multiplies the value by a travelling direction distance coefficient to define the distance between the two points. It is different from the moving path cluster extraction unit 24 according to the second exemplary embodiment in that clustering is performed in consideration of the two values defined per point. Other processing are the same as those in the second exemplary embodiment.

For example, each moving direction vector does not head in each other's position information log in terms of the position information log 401a and the position information log 401b contained in the position information log group 401 illustrated in FIG. 12. Thus, even when the value of the travelling direction distance coefficient is used with reference to any of the position information log 401a and the position information log 401b, the Euclidean distance multiplied by the travelling direction distance coefficient (see the Equation 2) is long. Thus, the two position information logs are difficult to cluster.

On the other hand, the moving direction vector of the position information log 402a heads in the position information log 402b in terms of the position information log 402a and the position information log 402b contained in the position information log group 402 illustrated in FIG. 12. On the other hand, the moving direction vector of the position information log 402b heads in a direction away from the direction of the position information log 402a. Thus, the value of the travelling direction distance coefficient calculated with reference to the position information log 402b increases, but the value of the travelling direction distance coefficient calculated with reference to the position information log 402a decreases. At this time, the moving path cluster extraction unit 24 performs clustering in the ascending order of the value of the Euclidean distance multiplied by the travelling direction distance coefficient, and consequently the two position information logs are easily clustered.

As described above, according to the present exemplary embodiment, the travelling direction distance coefficient calculation unit 25 calculates the travelling direction distance coefficient per position information log based on the two position information logs. The moving path cluster extraction unit 24 weights the position information log so that a Euclidean distance in a time direction is easily determined as long with reference to latitude and longitude, and performs weighting by multiplying the Euclidean distance by the travelling direction distance coefficient. The moving path cluster extraction unit 24 clusters a position information log determined as having the non-stay point attribute among the weighted position information logs, and thus extracts a user's moving path. Therefore, in addition to the effects of the first exemplary embodiment, an accuracy of classifying the moving path clusters can be enhanced.

Example

Although the present invention will be described below based on specific examples, the scope of the present invention is not limited to the following contents.

At first, when receiving a position information log with one record of [latitude, longitude, time], the position information log input unit 10 inputs the position information log in the clustering space plot unit 21. The clustering space plot unit 21 extracts a position information log on a set day with a preset time as a day base. The clustering space plot unit 21 plots a record containing [latitude, longitude, time] into a 3D clustering space, and inputs the plotted data in the stay point cluster extraction unit 22.

When receiving the data plotted in the clustering space, the stay point cluster extraction unit 22 multiplies the values indicating latitude and longitude of the data plotted in the clustering space by a preset weight value, respectively. Herein, all the data plotted in the clustering space and multiplied by the set weight value is assumed as initial clusters.

Then, the stay point cluster extraction unit 22 determines whether a Euclidean distance between two points selected from all the clusters exceeds a preset Euclidean distance threshold. When the Euclidean distance does not exceed the threshold, the stay point cluster extraction unit 22 unifies the clusters with the shortest Euclidean distance between two points selected from all the clusters into one cluster.

At this time, the stay point cluster extraction unit 22 unifies the clusters to contain times, latitudes and longitudes of the respective position information logs configuring the cluster. Further, the stay point cluster extraction unit 22 calculates a value of the center of gravity for latitudes and longitudes from the position information logs contained in the cluster in addition to the respective position information logs, and assumes the value as a new cluster data value. The stay point cluster extraction unit 22 holds the number of items of clustering space data contained in the unified cluster.

On the other hand, when the Euclidean distance exceeds the threshold, the stay point cluster extraction unit 22 determines a cluster containing more items of clustering space data than a set cluster number threshold as a stay point. Then, the stay point cluster extraction unit 22 assumes the earliest time among the data in the cluster as a stay start time, and assumes the latest time as a stay end time. The stay point cluster extraction unit 22 stores the stay start time, the stay end time, and the value of the center of gravity for latitudes and longitudes of the data in the cluster into the stay point pattern storage unit 31.

The stay point cluster extraction unit 22 inputs the data received from the clustering space plot unit 21 (or the data plotted in the clustering space) and the data determined as a stay point (the stay point pattern data) in the stay point position information log removal unit 23.

The stay point position information log removal unit 23 subtracts the data determined as a stay point contained in the stay point pattern data from the data plotted in the clustering space. Then, the stay point position information log removal unit 23 inputs the rest data in the data plotted in the clustering space into the moving path cluster extraction unit 24.

Then, when receiving the data from the stay point position information log removal unit 23, the moving path cluster extraction unit 24 multiplies the latitude and the longitude of the received data by the preset weight value, respectively. Herein, all the data multiplied by the weight value is assumed as initial clusters.

The moving path cluster extraction unit 24 determines whether a Euclidean distance between two points selected from all the clusters exceeds the set Euclidean distance threshold. When the Euclidean distance does not exceed the threshold, the moving path cluster extraction unit 24 unifies the clusters with the shortest Euclidean distance between two points selected from all the clusters into one cluster. At this time, the moving path cluster extraction unit 24 unifies the clusters to contain times, latitude, and longitudes of the respective position information logs configuring the cluster. Further, the moving path cluster extraction unit 24 calculates a value of the center of gravity for latitudes and longitudes from the position information logs contained in the cluster in addition to the respective position information logs, and assumes the value as a new cluster data value. The moving path cluster extraction unit 24 holds the number of items of clustering space data contained in the unified cluster.

On the other hand, when the Euclidean distance exceeds the threshold, the moving path cluster extraction unit 24 determines a cluster containing more items of clustering space data than the set cluster number threshold as a moving path. Then, the moving path cluster extraction unit 24 assumes the earliest time among the data in the cluster as a moving start time, and assumes the latest time as a moving end time.

Further, the moving path cluster extraction unit 24 compares the position information (latitude and longitude) of the cluster with the position information (latitude and longitude) of the stay point contained in the stay point pattern data received from the stay point position information log removal unit 23. The moving path cluster extraction unit 24 determines a stay point with the shortest Euclidean distance relative to the cluster position and a stay point with the second shortest distance as first close stay point identifier and second close stay point identifier, respectively. The moving path cluster extraction unit 24 stores the moving start time, the moving end time, the first close stay point identifier and the second close stay point identifier in the moving path pattern storage unit 32.

Figure 15:
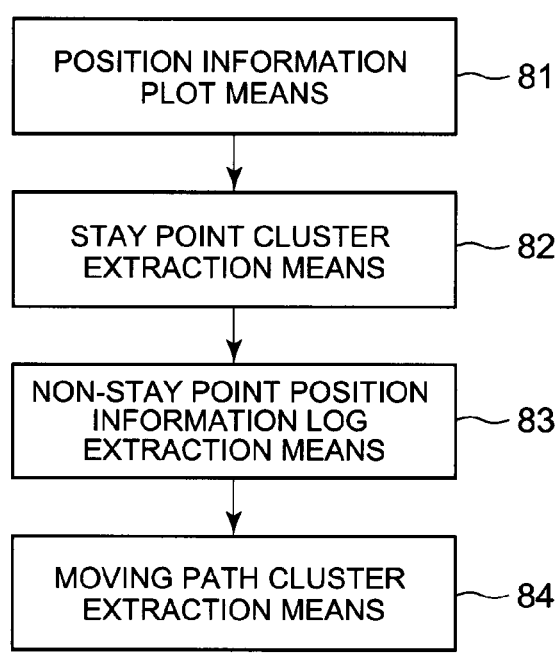
FIG. 15 It depicts a block diagram illustrating an exemplary minimum structure of the action pattern analysis device according to the present invention.

An exemplary minimum structure of the present invention will be described below. FIG. 15 is a block diagram illustrating an exemplary minimum structure of an action pattern analysis device according to the present invention. The action pattern analysis device according to the present invention comprises a position information plot means 81 (such as the clustering space plot unit 21) for plotting a position information log containing a user's measurement position (such as latitude, longitude, altitude) and measurement date/time (such as time) on a multidimensional space (such as a 3D space defined by latitude, longitude and time) defined by numerical information (such as latitude, longitude, altitude) indicating the measurement position and a time, a stay point cluster extraction means 82 (such as the stay point cluster extraction unit 22) for weighting (such as a processing of multiplying a time by a weight value k) a position information log so that a Euclidean distance in a time direction (such as in the time axis direction) relative to a position information space (such as latitude-longitude plan) defined by the numerical information indicating the measurement position in the multidimensional space is easily determined as short, and for clustering the weighted position information logs thereby to extract a stay point where the user frequently stays, a non-stay point position information log extraction means 83 (such as the stay point position information log removal unit 23) for extracting, as non-stay points, a set of position information logs in which a position information log extracted as the stay point is removed from the position information logs plotted by the position information plot means 81, and a moving path cluster extraction means 84 (such as the moving path cluster extraction unit 24) for weighting (such as a processing of multiplying a time by a weight value k) position information logs at the non-stay points so that a Euclidean distance in the time direction relative to the position information space is easily determined as long, and for clustering the weighted position information logs thereby to extract a user's moving path.

With the structure, also when position information is measured at longer time intervals or position information is irregularly measured, a user's action pattern can be analyzed with a good accuracy.

Figure 16:
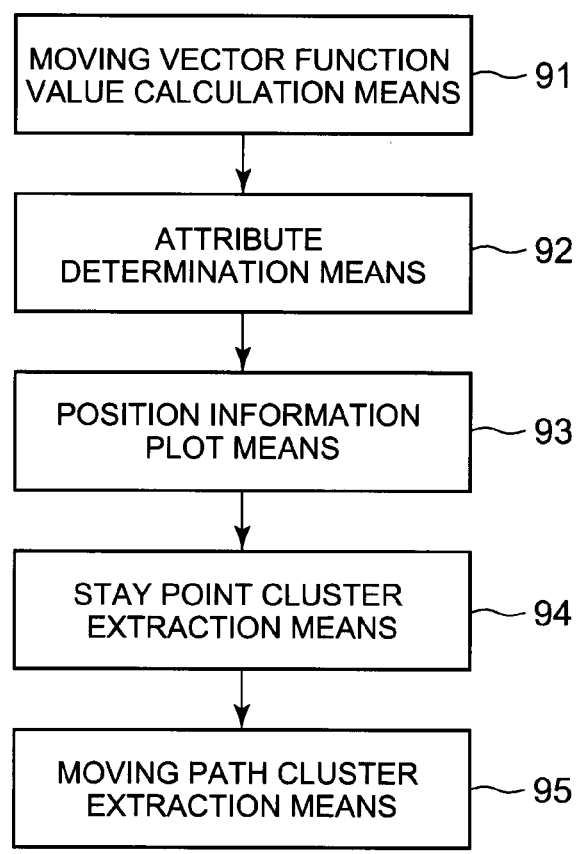
FIG. 16 It depicts a block diagram illustrating another exemplary minimum structure of the action pattern analysis device according to the present invention.

FIG. 16 is a block diagram illustrating another exemplary minimum structure of the action pattern analysis device according to the present invention. Another action pattern analysis device according to the present invention comprises a moving vector function value calculation means 91 (such as the moving vector function value calculation unit 41) for calculating a time different in measurement date/time contained in position information logs, and a distance between measurement positions as differential values between the two adjacent position information logs sorted in an order of measurement date/time contained in the position information logs containing a user's measurement position (such as latitude, longitude, altitude) and measurement date/time (such as time), an attribute determination means 92 (such as the stay/moving path attribute determination unit 42) for determining, based on the time difference in measurement date/time and the distance between the measurement positions, whether an attribute of a position information log is a stay attribute indicating a stay point where the user frequently stays or a non-stay attribute (such as moving attribute) indicating a non-stay point on a user's moving path, a position information plot means 93 (such as the clustering space plot unit 21) for plotting a position information log in a multidimensional space (such as a 3D space defined by latitude, longitude and time) defined by numerical information (such as latitude, longitude, altitude) indicating the measurement position and a time, a stay point cluster extraction means 94 (such as the stay point cluster extraction unit 22) for weighting position information logs so that a Euclidean distance in a time direction (in the time axis direction, for example) relative to a position information space (such as latitude-longitude plan) defined by numerical information indicating the measurement position in the multidimensional space, and clustering the position information logs determined as having the stay attribute among the weighted position information logs thereby to extract a stay point, and a moving path cluster extraction means 95 (such as the moving path cluster extraction unit 24) for weighting position information logs so that a Euclidean distance in a time direction relative to a position information space is easily determined as long, and for clustering position information logs determined as having the non-stay attribute among the weighted position information logs thereby to extract a user's moving path.

Even with the structure, when position information is measured at longer time intervals or position information is irregularly measured, a user's action pattern can be analyzed with a good accuracy.

The moving vector function value calculation means 91 may calculate a differential value of a travelling direction angle (θ, for example) indicating a travelling direction between measurement positions as a differential value between two position information logs. The position information plot means 93 may plot a record in which a travelling direction angle is added to a position information log containing a user's measurement position and measurement date/time (such as a record containing [latitude, longitude, time, travelling direction angle]) in a multidimensional space defined by numerical information indicating the measurement position, a time, and the travelling direction angle (such as a 4D space defined by latitude, longitude, altitude and time). The moving path cluster extraction means 95 may cluster a record in which a travelling direction angle is added to a position information log determined as having the moving path attribute, thereby to extract a user's moving path.

Part of or all the exemplary embodiments may be described as in the following Supplementary notes, but are not limited thereto.

(Supplementary note 1) An action pattern analysis device comprising a position information plot means for plotting a position information log containing a user's measurement position and measurement date/time on a multidimensional space defined by numerical information indicating the measurement position and a time, a stay point cluster extraction means for weighting the position information log so that a Euclidean distance in a time direction relative to a position information space defined by the numerical information indicating the measurement position in the multidimensional space is easily determined as short, and for clustering the weighted position information logs thereby to extract a stay position where the user frequently stays, a non-stay point position information log extraction means for extracting, as non-stay points, a set of position information logs in which a position information log extracted as the stay point is removed from the position information logs plotted by the position information plot means, and a moving path cluster extraction means for weighting position information logs at the non-stay points so that a Euclidean distance in a time direction relative to the position information space is easily determined as long, and for clustering the weighted position information logs thereby to extract a user's moving path.

(Supplementary note 2) The action pattern analysis device according to Supplementary note 1, wherein the position information plot means plots a position information log containing values indicating latitude and longitude as a user's measurement position on a 3D space defined by latitude, longitude and time, and the stay point cluster extraction means weights the position information log so that a Euclidean distance in a time direction relative to a latitude/longitude plan defined by latitude and longitude in the 3D space is easily determined as short.

(Supplementary note 3) The action pattern analysis device according to Supplementary note 1, wherein the position information plot means plots a position information log containing values indicating latitude, longitude and altitude as a user's measurement position on a 4D space defined by latitude, longitude, altitude and time, and the stay point cluster extraction means weights the position information log so that a Euclidean distance in a time direction relative to a latitude/longitude/altitude space defined by latitude, longitude and altitude in the 4D space is easily determined as short.

(Supplementary note 4) The action pattern analysis device according to Supplementary note 3, wherein the moving path cluster extraction means weights position information logs at non-stay points so that a Euclidean distance in a time direction relative to a latitude/longitude/altitude space is easily determined as long.

(Supplementary note 5) The action pattern analysis device according to any one of Supplementary note 1 to Supplementary note 4, wherein the moving path cluster extraction means determines a stay point with the shortest Euclidean distance relative to a clustered position information log and a stay point with the second shortest distance as a start point of a moving path and an end point, respectively.

(Supplementary note 6) The action pattern analysis device according to any one of Supplementary note 1 to Supplementary note 5, wherein the moving path cluster extraction means compares a value of the center of gravity of position information in clustered position information logs and a value of the center of gravity of position information at stay points, and determines a stay point with the shortest distance and a stay point with the second shortest distance as a start point of a moving path and an end point, respectively.

(Supplementary note 7) An action pattern analysis device comprising a moving vector function value calculation means for calculating a time difference in measurement date/time contained in position information logs and a distance between measurement positions as differential values between the two adjacent position information logs sorted in an order of measurement date/time contained in the position information logs containing a user's measurement position and measurement date/time, an attribute determination means for determining, based on the time difference in measurement date/time and the distance between the measurement positions, whether an attribute of the position information log is a stay attribute indicating a stay point where the user frequently stays or a non-stay attribute indicating a non-stay point on a user's moving path, a position information plot means for plotting the position information log on a multidimensional space defined by the numerical information indicating the measurement position and a time, a stay point cluster extraction means for weighting the position information log so that a Euclidean distance in a time direction relative to a position information space defined by the numerical information indicating the measurement position in the multidimensional space is easily determined as short, and for clustering a position information log determined as having the stay attribute among the weighted position information logs thereby to extract the stay point, and a moving path cluster extraction means for weighting the position information log so that a Euclidean distance in a time direction relative to the position information space is easily determined as long, and for clustering position information logs determined as having the non-stay attribute among the weighted position information logs thereby to extract a user's moving path.

(Supplementary note 8) The action pattern analysis device according to Supplementary note 7, wherein the moving vector function value calculation means calculates a differential value of a travelling direction angle indicating a travelling direction between measurement positions as a differential value between two position information logs, the position information plot means plots a record in which a travelling direction angle is added to a position information log containing a user's measurement position and measurement date/time on a multidimensional space defined by numerical information indicating the measurement position, a time, and the travelling direction angle, and the moving path cluster extraction means clusters a record in which a travelling direction angle is added to a position information log determined as having the moving path attribute thereby to extract a user's moving path.

(Supplementary note 9) The action pattern analysis device according to Supplementary note 7, comprising a travelling direction distance coefficient calculation means for calculating, per position information log, a travelling direction distance coefficient which is smaller as a value of an angle formed by a travelling direction from a measurement position indicated by each of the position information logs and a direction connecting measurement positions indicated by the two position information logs based on the two position information logs, wherein the moving path cluster extraction means weights the position information log so that a Euclidean distance in a time direction relative to a position information space is easily determined as long, and performs weighting by multiplying the Euclidean distance by a travelling direction distance coefficient calculated by the moving direction distance coefficient calculation means, and clusters position information logs determined as having the non-stay attribute among the weighted position information logs thereby to extract a user's moving path.

(Supplementary note 10) An action pattern analysis method comprising plotting a position information log containing a user's measurement position and measurement date/time on a multidimensional space defined by numerical information indicating the measurement position and a time, weighting the position information log so that a Euclidean distance in a time direction relative to a position information space defined by the numerical information indicating the measurement position in the multidimensional space is easily determined as short, and clustering the weighted position information logs thereby to extract a stay position where the user frequently stays, extracting, as non-stay points, a set of position information logs in which a position information log extracted as the stay point is removed from the position information logs plotted on the multidimensional space, and weighting position information logs at the non-stay points so that a Euclidean distance in a time direction relative to the position information space is easily determined as long, and clustering the weighted position information logs thereby to extract a user's moving path.

(Supplementary note 11) The action pattern analysis method according to Supplementary note 10 which plots a position information log containing values indicating latitude and longitude as a user's measurement position on a 3D space defined by latitude, longitude and time, and weights the position information log so that a Euclidean distance in a time direction relative to a latitude/longitude plan defined by latitude and longitude in the 3D space is easily determined as short.

(Supplementary note 12) The action pattern analysis method according to Supplementary note 10 which plots a position information log containing values indicating latitude, longitude and altitude as a user's measurement position on a 4D space defined by latitude, longitude, altitude and time, and weights the position information log so that a Euclidean distance in a time direction relative to a latitude/longitude/altitude space defined by latitude, longitude and altitude in the 4D space is easily determined as short.

(Supplementary note 13) The action pattern analysis method according to Supplementary note 12 which weights a position information log at a non-stay point so that a Euclidean distance in a time direction relative to a latitude/longitude/altitude space is easily determined as long.

(Supplementary note 14) An action pattern analysis method comprising calculating a time difference in measurement date/time contained in position information logs and a distance between measurement positions as differential values between the two adjacent position information logs sorted in an order of measurement date/time contained in the position information logs containing a user's measurement position and measurement date/time, determining, based on the time difference in measurement date/time and the distance between the measurement positions, whether an attribute of the position information log is a stay attribute indicating a stay point where the user frequently stays or a non-stay attribute indicating a non-stay point on a user's moving path, plotting the position information log on a multidimensional space defined by the numerical information indicating the measurement position and a time, weighting the position information log so that a Euclidean distance in a time direction relative to a position information space defined by the numerical information indicating the measurement position in the multidimensional space is easily determined as short, and clustering position information logs determined as having the stay attribute among the weighted position information logs thereby to extract the stay point, and weighting the position information log so that a Euclidean distance in a time direction relative to the position information space is easily determined as long, and clustering position information logs determined as having the non-stay attribute among the weighted position information logs thereby to extract a user's moving path.

(Supplementary note 15) The action pattern analysis method according to Supplementary note 14 which calculates a differential value of a travelling direction angle indicating a travelling direction between measurement positions as a differential value between two position information logs, plots a record in which a travelling direction angle is added to a position information log containing a user's measurement position and measurement date/time on a multidimensional space defined by numerical information indicating the measurement position, a time and the travelling direction angle, and clusters a record in which a travelling direction angle is added to a position information log determined as having the moving path attribute thereby to extract a user's moving path.

(Supplementary note 16) The action pattern analysis method according to Supplementary note 14 which calculates, per position information log, a travelling direction distance coefficient which is smaller as a value of an angle formed by a travelling direction from a measurement position indicated by each of the position information logs and a direction connecting the measurement positions indicated by the two position information logs based on the two position information logs, weights the position information logs so that a Euclidean distance in a time direction relative to a position information space is easily determined as long, performs weighting by multiplying the Euclidean distance by the calculated travelling direction distance coefficient, and clusters position information logs determined as having the non-stay attribute among the weighted position information logs thereby to extract a user's moving path.

(Supplementary note 17) An action pattern analysis program for causing a computer to perform a position information plot processing of plotting a position information log containing a user's measurement position and measurement date/time on a multidimensional space defined by numerical information indicating the measurement position and a time, a stay point cluster extraction processing of weighting the position information log so that a Euclidean distance in a time direction relative to a position information space defined by the numerical information indicating the measurement position in the multidimensional space is easily determined as short, and clustering the weighted position information logs thereby to extract a stay point where the user frequently stays, a non-stay point position information log extraction processing of extracting, as non-stay points, a set of position information logs in which a position information log extracted as the stay point is removed from the position information logs plotted by the position information plot processing, and a moving path cluster extraction processing of weighting position information logs at the non-stay points so that a Euclidean distance in a time direction relative to the position information space is easily determined as long, and clustering the weighted position information logs thereby to extract a user's moving path.

(Supplementary note 18) The action pattern analysis program according to Supplementary note 17 for causing a computer to perform a position information plot processing of plotting a position information log containing values indicating latitude and longitude as a user's measurement position on a 3D space defined by latitude, longitude and time, and a stay point cluster extraction processing of weighting the position information log so that a Euclidean distance in a time direction relative to a latitude/longitude plan defined by latitude and longitude in the 3D space is easily determined as short.

(Supplementary note 19) The action pattern analysis program according to Supplementary note 17 for causing a computer to perform a position information plot processing of plotting a position information log containing values indicating latitude, longitude and altitude as a user's measurement position on a 4D space defined by latitude, longitude, altitude and time, and a stay point cluster extraction processing of weighting the position information log so that a Euclidean distance in a time direction relative to a latitude/longitude/altitude space defined by latitude, longitude and altitude in the 4D space is easily determined as short.

(Supplementary note 20) The action pattern analysis program according to Supplementary note 19 for causing a computer to perform a moving path cluster extraction processing of weighting a position information log at a non-stay point so that a Euclidean distance in a time direction relative to a latitude/longitude/altitude space is easily determined as long.

(Supplementary note 21) An action pattern analysis program for causing a computer to perform a moving vector function value calculation processing of calculating a time difference in measurement date/time contained in position information logs and a distance between measurement positions as differential values between the two adjacent position information logs sorted in an order of measurement date/time contained in the position information logs containing a user's measurement position and measurement date/time, an attribute determination processing of determining, based on the time difference in measurement date/time and the distance between the measurement positions, whether an attribute of the position information log is a stay attribute indicating a stay point where the user frequently stays or a non-stay attribute indicating a non-stay point on a user's moving path, a position information plot processing of plotting the position information log on a multidimensional space defined by the numerical information indicating the measurement position and a time, a stay point cluster extraction processing of weighting the position information log so that a Euclidean distance in a time direction relative to a position information space defined by the numerical information indicating the measurement position in the multidimensional space is easily determined as short, and clustering a position information log determined as having the stay attribute among the weighted position information logs thereby to extract the stay point, and a moving path cluster extraction processing of weighting the position information log so that a Euclidean distance in a time direction relative to the position information space is easily determined as long, and clustering position information logs determined as having the non-stay attribute among the weighted position information logs thereby to extract a user's moving path.

(Supplementary note 22) The action pattern analysis program according to Supplementary note 21 for causing a computer to perform a moving vector function value calculation processing of calculating a differential value of a travelling direction angle indicating a travelling direction between measurement positions as a differential value between two position information logs, a position information plot processing of plotting a record in which a travelling direction angle is added to a position information log containing a user's measurement position and measurement date/time on a multidimensional space defined by numerical information indicating the measurement position, a time and the travelling direction angle, and a moving path cluster extraction processing of clustering a record in which a travelling direction angle is added to a position information log determined as having the moving path attribute thereby to extract a user's moving path.

(Supplementary note 23) The action pattern analysis program according to Supplementary note 21 for causing a computer to perform a travelling direction distance coefficient calculation processing of calculating, per position information log, a travelling direction distance coefficient which is smaller as a value of an angle formed by a travelling direction from a measurement position indicated by each of the position information logs and a direction connecting the measurement positions indicated by the two position information logs based on the two position information logs, and a moving path cluster extraction processing of weighting the position information log so that a Euclidean distance in a time direction relative to a position information space is easily determined as long, performing weighting by multiplying the Euclidean distance by a travelling direction distance coefficient calculated by the moving direction distance coefficient calculation processing, and clustering position information logs determined as having the non-stay attribute among the weighted position information logs thereby to extract a user's moving path.

The present invention has been described above with reference to the exemplary embodiments and the examples, but the present invention is not limited to the exemplary embodiments and the examples. The structure and details of the present invention can be variously changed within the scope of the present invention understood by those skilled in the art.

(Supplementary note 1) An action pattern analysis device comprising: an unit for receiving an input set of position information logs in which a position information log corresponding to a stay point where the user stays is removed from a set of position information logs containing a user's measurement position and measurement time; and a moving path cluster extraction unit for weighting the input set of position information logs so that a Euclidean distance in a time direction relative to a position information space defined by numerical information indicating the measurement position on a multidimensional space defined by the numerical information indicating the measurement position and a time is easily determined as long, and for clustering the weighted position information logs thereby to extract a user's moving path.

(Supplementary note 2) An action pattern analysis method comprising: calculating a time difference in measurement time contained in position information logs and a distance between the measurement positions as differential values between the two adjacent position information logs sorted in an order of measurement time contained in the position information logs containing a user's measurement position and measurement time; determining, based on the time difference in measurement time and the distance between the measurement positions, whether an attribute of the position information log is a stay attribute indicating a stay point where the user frequently stays or a non-stay attribute indicating a non-stay point on a user's moving path; plotting the position information log on a multidimensional space defined by the numerical information indicating the measurement position and a time; weighting the position information log so that a Euclidean distance in a time direction relative to a position information space defined by the numerical information indicating the measurement position in the multidimensional space is easily determined as short, and clustering position information logs determined as having the stay attribute among the weighted position information logs thereby to extract the stay point; and weighting the position information log so that a Euclidean distance in a time direction relative to the position information space is easily determined as long, and clustering position information logs determined as having the non-stay attribute among the weighted position information logs thereby to extract a user's moving path.

(Supplementary note 3) A non-transitory computer readable information recording medium storing an action pattern analysis program that, when executed by a processor, performs a method for: calculating a time difference in measurement time contained in position information logs and a distance between measurement positions as differential values between the two adjacent position information logs sorted in an order of measurement time contained in the position information logs containing a user's measurement position and measurement time; determining, based on the time difference in measurement time and the distance between the measurement positions, whether an attribute of the position information log is a stay attribute indicating a stay point where the user frequently stays or a non-stay attribute indicating a non-stay point on a user's moving path; plotting the position information log on a multidimensional space defined by the numerical information indicating the measurement position and a time; weighting the position information log so that a Euclidean distance in a time direction relative to a position information space defined by the numerical information indicating the measurement position in the multidimensional space is easily determined as short, and clustering position information logs determined as having the stay attribute among the weighted position information logs thereby to extract the stay point; and weighting the position information log so that a Euclidean distance in a time direction relative to the position information space is easily determined as long, and clustering position information logs determined as having the non-stay attribute among the weighted position information logs thereby to extract a user's moving path.

The present application claims the priority based on Japanese Patent Application No. 2011-006260 filed on Jan. 14, 2011, Japanese Patent Application No. 2011-109400 filed on May 16, 2011, and Japanese Patent Application No. 2011-206345 filed on Sep. 21, 2011, the entirety of which is incorporated by reference.

INDUSTRIAL APPLICABILITY

The present invention is suitably applied to an action pattern analysis device for analyzing an action pattern based on irregularly-measured position information. For example, even when position information is measured at longer time intervals by use of a terminal with a position information acquisition function or position information is irregularly measured, a user's action pattern can be grasped. Thus, an accuracy of a recommend service for distributing contents according to a user's action pattern is enhanced.

REFERENCE SIGNS LIST

10 Position information log input unit
11 Action pattern analysis reference input unit
20, 50, 60 Action pattern analysis unit
21 Clustering space plot unit
22 Stay point cluster extraction unit
23 Stay point position information log removal unit
24 Moving path cluster extraction unit
25 Travelling direction distance coefficient calculation unit
30 Action pattern storage unit
31 Stay point pattern storage unit
32 Moving path pattern storage unit
40 Moving vector calculation analysis unit
41 Moving vector function value calculation unit
42 Stay/moving path attribute determination unit

The invention claimed is:
1. An action pattern analysis device comprising:
hardware including a processor;
a stay point cluster extraction unit, implemented at least by the hardware, for clustering position information logs containing a user's measurement position and measurement time thereby to extract a stay point where the user stays;
a non-stay point position information log extraction unit, implemented at least by the hardware, for extracting a set of position information logs from which a position information log extracted as the stay point is removed;
a moving path cluster extraction unit, implemented at least by the hardware, for clustering the extracted set of position information logs plotted in a multidimensional space defined by numerical information indicating the measurement position and a time based on a Euclidean distance on the multidimensional space thereby to extract a user's moving path; and
a position information plot unit, implemented at least by the hardware, for plotting a position information log containing the user's measurement position and the measurement time on the multidimensional space defined by the numerical information indicating the measurement position and the time,
wherein the moving path cluster extraction unit weights the extracted set of position information logs by applying a first weight to the Euclidean distance in a time direction in a position information space defined by numerical information indicating the measurement position on the multidimensional space, and clusters the position information logs weighted by applying the first weight,
wherein the position information plot unit plots a position information log containing values indicating latitude and longitude as a user's measurement position on a 3D space defined by latitude, longitude and time,
wherein the stay point cluster extraction unit weights the position information log by applying a second weight to the Euclidean distance in the time direction relative to a latitude/longitude plan defined by latitude and longitude in the 3D space, and
wherein the moving path cluster extraction unit weights the extracted set of position information logs by applying the first weight to the Euclidean distance in the time direction relative to the latitude/longitude plan defined by latitude and longitude in the 3D space.

2. An action pattern analysis device comprising
hardware including a processor;
a moving vector function value calculation unit, implemented at least by the hardware, for calculating a time different in measurement time contained in position information logs and a distance between measurement positions as differential values between two adjacent position information logs sorted in an order of measurement time contained in the position information logs containing a user's measurement position and measurement time;
an attribute determination unit, implemented at least by the hardware, for determining, based on the time difference in measurement time and the distance between the measurement positions, whether an attribute of the position information log is a stay attribute indicating a stay point where the user frequently stays or a non-stay attribute indicating a non-stay point on a user's moving path;
a position information plot unit, implemented at least by the hardware, for plotting the position information log on a multidimensional space defined by numerical information indicating the measurement position and a time;
a stay point cluster extraction unit, implemented at least by the hardware, for weighting the position information log by applying a first weight to a Euclidean distance in a time direction relative to a position information space defined by the numerical information indicating the measurement position in the multidimensional space, and for clustering position information logs determined as having the stay attribute among the position information logs weighted by applying the first weight thereby to extract the stay point; and a moving path cluster extraction unit, implemented at least by the hardware, for clustering the position information log plotted in the multidimensional space based on a Euclidean distance on the multidimensional space thereby to extract a user's moving path, wherein the moving path cluster extraction unit weights the extracted set of position information log by applying a second weight to the Euclidean distance in the time direction in a position information space defined by numerical information indicating the measurement position on the multidimensional space, and clusters the position information log weighted by applying the second weight.

3. The action pattern analysis device according to claim 2, wherein the moving vector function value calculation unit calculates a differential value of a travelling direction angle indicating a travelling direction between measurement positions as a differential value between two position information logs, the position information plot unit plots a record in which a travelling direction angle is added to a position information log containing a user's measurement position and measurement time on a multidimensional space defined by numerical information indicating the measurement position, a time and the travelling direction angle, and the moving path cluster extraction unit clusters a record in which a travelling direction angle is added to a position information log determined as having a moving path attribute thereby to extract a user's moving path.

4. The action pattern analysis device according to claim 2, further comprising:

a travelling direction distance coefficient calculation unit, implemented at least by the hardware, for calculating, per position information log, a travelling direction distance coefficient which is smaller as a value of an angle formed by a travelling direction from a measurement position indicated by each of the position information logs and a direction connecting measurement positions indicated by two position information logs based on the two position information logs, wherein the moving path cluster extraction unit performs weighting by multiplying the Euclidean distance by a travelling direction distance coefficient calculated by the travelling direction distance coefficient calculation unit, and clusters position information logs determined as having the non-stay attribute among the position information logs weighted by using the travelling direction distance coefficient thereby to extract a user's moving path.

5. An action pattern analysis method comprising:

clustering position information logs containing a user's measurement position and measurement time thereby to extract a stay point where the user stays;

extracting a set of position information logs from which a position information log extracted as the stay point is removed;

clustering the extracted set of position information logs plotted in a multidimensional space defined by numerical information indicating the measurement position and a time based on a Euclidean distance on the multidimensional space thereby to extract a user's moving path, and plotting a position information log containing a user's measurement position and measurement time on a multidimensional space defined by numerical information indicating the measurement position and a time, wherein the clustering the extracted set of position information logs comprises weighting the extracted set of position information logs by applying a first weight to the Euclidean distance in a time direction in a position information space defined by numerical information indicating the measurement position on the multidimensional space, and clustering the position information logs weighted by applying the first weight, wherein the plotting the position information log comprises plotting a position information log containing values indicating latitude and longitude as a user's measurement position on a 3D space defined by latitude, longitude and time, wherein the clustering the position information logs comprises weighting the position information log by applying a second weight to a Euclidean distance in a time direction relative to a latitude/longitude plan defined by latitude and longitude in the 3D space, and wherein the clustering the extracted set of position information logs comprises weighting the extracted set of position information logs by applying the first weight to the Euclidean distance in the time direction relative to the latitude/longitude plan defined by latitude and longitude in the 3D space.

6. A non-transitory computer readable information recording medium storing an action pattern analysis program that, when executed by a processor, performs a method for:

clustering position information logs containing a user's measurement position and measurement time thereby to extract a stay point where the user frequently stays;

extracting a set of position information logs from which a position information log extracted as the stay point is removed;

clustering the extracted set of position information logs plotted in a multidimensional space defined by numerical information indicating the measurement position and a time based on a Euclidean distance on the multidimensional space thereby to extract a user's moving path, and plotting a position information log containing a user's measurement position and measurement time on a multidimensional space defined by the numerical information indicating the measurement position and the time, wherein the clustering the extracted set of position information logs comprises weighting the extracted set of position information logs by applying a first weight to the Euclidean distance in a time direction in a position information space defined by numerical information indicating the measurement position on the multidimensional space, and clustering the position information logs weighted by applying the first weight, wherein the plotting the position information log comprises plotting a position information log containing values indicating latitude and longitude as a user's measurement position on a 3D space defined by latitude, longitude and time, wherein the clustering the position information logs comprises weighting the position information log by applying a second weight to the Euclidean distance in the time direction relative to a latitude/longitude plan defined by latitude and longitude in the 3D space, and wherein the clustering the extracted set of position information logs comprises weighting the extracted set of position information logs by applying the first weight to the Euclidean distance in the time direction relative to the latitude/longitude plan defined by latitude and longitude in the 3D space.

* * * * *

UNITED STATES PATENT AND TRADEMARK OFFICE
CERTIFICATE OF CORRECTION

PATENT NO. : 9,497,584 B2  
APPLICATION NO. : 13/977386  
DATED : November 15, 2016  
INVENTOR(S) : Fumitaka Nakahara Page 1 of 1

It is certified that error appears in the above-identified patent and that said Letters Patent is hereby corrected as shown below:

Column 22, Line 52: Delete "$w_{12}$=-COS $\theta_{1to2}$" and insert --$w_{12}$=1-COS $\theta_{1to2}$--

Signed and Sealed this  
Fifth Day of September, 2017

Joseph Matal  
*Performing the Functions and Duties of the*  
*Under Secretary of Commerce for Intellectual Property and*  
*Director of the United States Patent and Trademark Office*